United States Patent
Fujiwara et al.

(10) Patent No.: US 9,134,485 B2
(45) Date of Patent: Sep. 15, 2015

(54) OPTICAL CONNECTOR CLEANING TOOL

(71) Applicant: FUJIKURA LTD., Koto-ku, Tokyo (JP)

(72) Inventors: Kunihiko Fujiwara, Sakura (JP); Junichi Nakane, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/291,287

(22) Filed: May 30, 2014

(65) Prior Publication Data

US 2014/0259481 A1  Sep. 18, 2014

Related U.S. Application Data

(63) Continuation of application No. PCT/JP2012/081326, filed on Dec. 4, 2012.

(30) Foreign Application Priority Data

Dec. 5, 2011 (JP) .................................. 2011-266132

(51) Int. Cl.
*G02B 6/38* (2006.01)
*B08B 1/00* (2006.01)

(52) U.S. Cl.
CPC .............. *G02B 6/3866* (2013.01); *B08B 1/008* (2013.01); *B08B 2240/02* (2013.01)

(58) Field of Classification Search
CPC .... B08B 1/006; B08B 1/008; B08B 2240/02; G02B 6/3866
USPC .......................... 15/97.1, 210.1; 385/134, 147
See application file for complete search history.

(56) References Cited

U.S. PATENT DOCUMENTS

| | | | | |
|---|---|---|---|---|
| 7,212,719 | B2 * | 5/2007 | Fujiwara et al. | 385/134 |
| 8,087,118 | B2 * | 1/2012 | Fujiwara | 15/97.1 |
| 2004/0086232 | A1 * | 5/2004 | Fujiwara et al. | 385/53 |
| 2004/0103491 | A1 * | 6/2004 | Fujiwara et al. | 15/97.1 |
| 2005/0286853 | A1 | 12/2005 | Fujiwara et al. | |
| 2008/0034519 | A1 * | 2/2008 | Fujiwara | 15/104.001 |
| 2010/0043159 | A1 | 2/2010 | Fujiwara | |

(Continued)

FOREIGN PATENT DOCUMENTS

| | | |
|---|---|---|
| CN | 1165959 A | 11/1997 |
| CN | 100442094 C | 12/2008 |

(Continued)

OTHER PUBLICATIONS

International Search Report for PCT/JP2012/081326 Jan. 22, 2013.

(Continued)

*Primary Examiner* — Monica Carter
*Assistant Examiner* — Michael Jennings
(74) *Attorney, Agent, or Firm* — Sughrue Mion, PLLC

(57) ABSTRACT

An optical connector cleaning tool includes a cleaning body that is fed and moved, a feeding mechanism that performs supply and take-up of the cleaning body, a housing body that houses the feeding mechanism, an extension portion that extends from the housing body, comprising a plurality of distal end tube portions, and an outer tube body through which the plurality of distal end tube portions pass, including a plurality of distal end openings from which the plurality of distal end tube portions are extended; and a head member that is passed through each of the plurality of distal end tube portions and that presses the cleaning body against the joining end face at the distal end of the extension portion.

7 Claims, 26 Drawing Sheets

(56) References Cited

U.S. PATENT DOCUMENTS

| | | |
|---|---|---|
| 2011/0072600 A1* | 3/2011 | Nakane et al. ............... 15/97.1 |
| 2011/0154599 A1* | 6/2011 | Nakane et al. ............... 15/210.1 |
| 2012/0017384 A1* | 1/2012 | Fujiwara ...................... 15/97.1 |

FOREIGN PATENT DOCUMENTS

| | | |
|---|---|---|
| JP | 6-68011 U | 9/1994 |
| JP | 9-197180 A | 7/1997 |
| JP | 2845791 B2 | 1/1999 |
| JP | 2004-317747 A | 11/2004 |
| JP | 2005-99451 A | 4/2005 |
| JP | 2010-186041 A | 8/2010 |
| WO | 2008/108278 A1 | 9/2008 |

OTHER PUBLICATIONS

Chinese Office Action for CN201280004857.X dated Jan. 20, 2014.
Extended European Search Report dated Jan. 14, 2015, issued by the European Patent Office in counterpart European application No. 12855554.7.

* cited by examiner

OPTICAL CONNECTOR CLEANING TOOL

CROSS REFERENCE TO RELATED APPLICATIONS

This application is a continuation application based on a PCT Patent Application No. PCT/JP2012/081326, filed Dec. 4, 2012, whose priority is claimed on Japanese Patent Application No. 2011-266132 filed Dec. 5, 2011, the entire contents of which are hereby incorporated by reference.

BACKGROUND OF THE INVENTION

1. Field of the Invention

The present invention relates to an optical connecting cleaning tool that cleans the joining end face of an optical connector with a cleaning body such as a fabric.

2. Description of the Related Art

When connecting an optical connector, if grime, a foreign material or the like is attached to a joining end face, it causes damage at the time of connection and disconnection, an increase in transmission loss, or the like. For this reason, it is necessary to clean the joining end face prior to the butt-joint connection.

For cleaning of the joining end face of the optical connector, an optical connector cleaning tool that wipes away grime or the like by bringing a cleaning body such as a fabric into contact with the joining end face is used (for example, refer to PCT International Publication No. 2008/108278).

This kind of optical connector cleaning tool has an extension portion that is inserted into an optical connector, and at the distal end of the extension portion causes the cleaning body to make contact with the joining end face of the optical connector.

As a member that an optical connector cleaning tool cleans, there is an optical connector that has a plurality of connector receiving holes. Also, sometimes the optical connector cleaning tool cleans a plurality of optical connectors.

In this way, in the case of a structure that has a plurality of connector receiving holes, since it is necessary to clean the cleaning object (optical plug and the like) in the plurality of optical connector receiving holes one at a time, the work is time consuming.

SUMMARY OF THE INVENTION

The present invention was achieved in view of the above circumstances, and provides an optical connector cleaning tool that can raise the work efficiency in the case of a structure having a plurality of connector receiving holes being the member to be cleaned.

One aspect of the present invention is an optical connector cleaning tool that wipes away and cleans a joining end face of an optical connector, the optical connector cleaning tool having: a cleaning body that is fed and moved; a feeding mechanism that performs supply and take-up of the cleaning body; a housing body that houses the feeding mechanism; and an extension portion that extends from the housing body, having a plurality of distal end tube portions, and an outer tube body through which the plurality of distal end tube portions pass, including a plurality of distal end openings from which the plurality of distal end tube portions are extended; passed through each of the plurality of distal end tube portions, in which the plurality of distal end openings are formed so that the plurality of distal end tube portions that pass through the plurality of distal end openings are capable of moving in directions of approaching and separating from each other.

The total width of the plurality of distal end openings is preferably greater than the total width of the plurality of distal end tube portions.

The outer tube body preferably has a plurality of passing-through holes that are respectively capable of passing the plurality of distal end tube portions; and the distal end opening is preferably formed at the distal end of the plurality of passing-through holes.

The width of each of the plurality of distal end openings is preferably greater than the width of the distal end tube portion that passes through each distal end opening.

The portion of the distal end tube portion that passes through the distal end opening preferably has an approximately rectangular shape in cross section, and the plurality of distal end openings preferably have an approximately rectangular shape corresponding to the cross-sectional shape of each of the distal end tube portions, and are formed side-by-side so that one side of each approximately rectangular shape faces one another.

The distal end tube portion preferably has a distal end wall portion and a tubular wall portion that extends from the circumferential edge portion of the distal end wall portion; and a sloped surface that is sloped toward the distal end direction in a direction gradually approaching a center axis of the distal end tube portion is preferably formed at the circumferential edge portion of the distal end wall portion.

The feeding mechanism preferably has a supply reel that supplies the cleaning body to the head member, and a take-up reel that takes up the cleaning body that has passed the head member, and the housing body is preferably provided with a driving portion that is capable of relative movement in an extension direction of the extension portion with respect to the feeding mechanism, and feeds and moves the cleaning body by rotatively driving the take-up reel in the take-up direction by the movement.

Further provided with rotation mechanisms of a number corresponding to the extension portion, in which the rotation mechanism preferably has a rotating shaft that rotates the head member about the axis thereof by relative movement of the housing body with respect to the extension portion; the rotating shaft preferably includes a rotating tube portion that has a cam groove into which an insertion protrusion portion of the housing body is inserted, and a guide tube portion in which the head member is mounted at the distal end, the rotating tube portion, when the housing body is made to undergo relative movement, preferably rotates about its own axis by movement along the cam groove, whereby it causes the head member to rotate about the axis thereof; and the rotating tube portions of a plurality of rotation mechanisms are preferably arranged with their respective positions shifted in the extension direction of the extension portion.

According to one aspect of the present invention, since the distal end tube portions are capable of moving in directions approaching or moving away from each other, the distal end tube portions are smoothly inserted into the connector receiving holes regardless of the positions of the connector receiving holes of the optical connector.

For that reason, it is possible to reliably clean a plurality of joining end faces with a single operation. Accordingly, it is possible to raise the work efficiency when cleaning the optical adapter.

DETAILED DESCRIPTION OF THE PREFERRED EMBODIMENTS

Hereinbelow, an optical connector cleaning tool 1 (hereinbelow, simply referred to as "cleaning tool") that is an embodiment of the present invention shall be described with reference to the figures.

Figure 24:
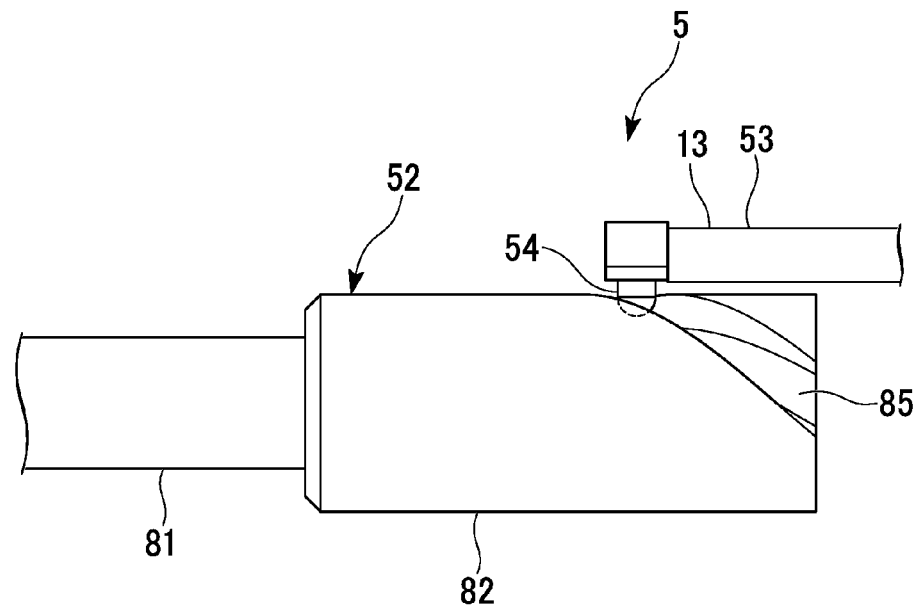
FIG. 24 is a process drawing that shows the operation of the rotating shaft.

As shown in FIGS. 1 to 4, the cleaning tool 1 includes a feeding mechanism 3 (refer to FIG. 16) that performs supply and take-up (winding) of a cleaning body 2, a housing body 11 that houses the feeding mechanism 3, an extension portion 21 that extends from the housing body 11, a head member 23 at the distal end of the extension portion 21 that presses the cleaning body 2 against the joining end face 61a, and a rotation mechanism 5 that rotates the head member 23 about its axis (refer to FIG. 24).

In the following description, the extension direction of the extension portion 21 (left side in FIG. 2) is sometimes referred to as the front, and the opposite direction (right side in FIG. 2) is sometimes referred to as the rear.

The housing body 11 has a tubular case portion 12 and a pressing body 13 that is located in the case portion 12 and positioned with respect to the case portion 12.

At the front end of the case portion 12, an insertion opening 12a is formed in which the extension portion 21 is inserted, and at the rear end of the case portion 12, an opening portion 12b is formed through which the feeding mechanism 3 is taken in and out.

Figure 5:
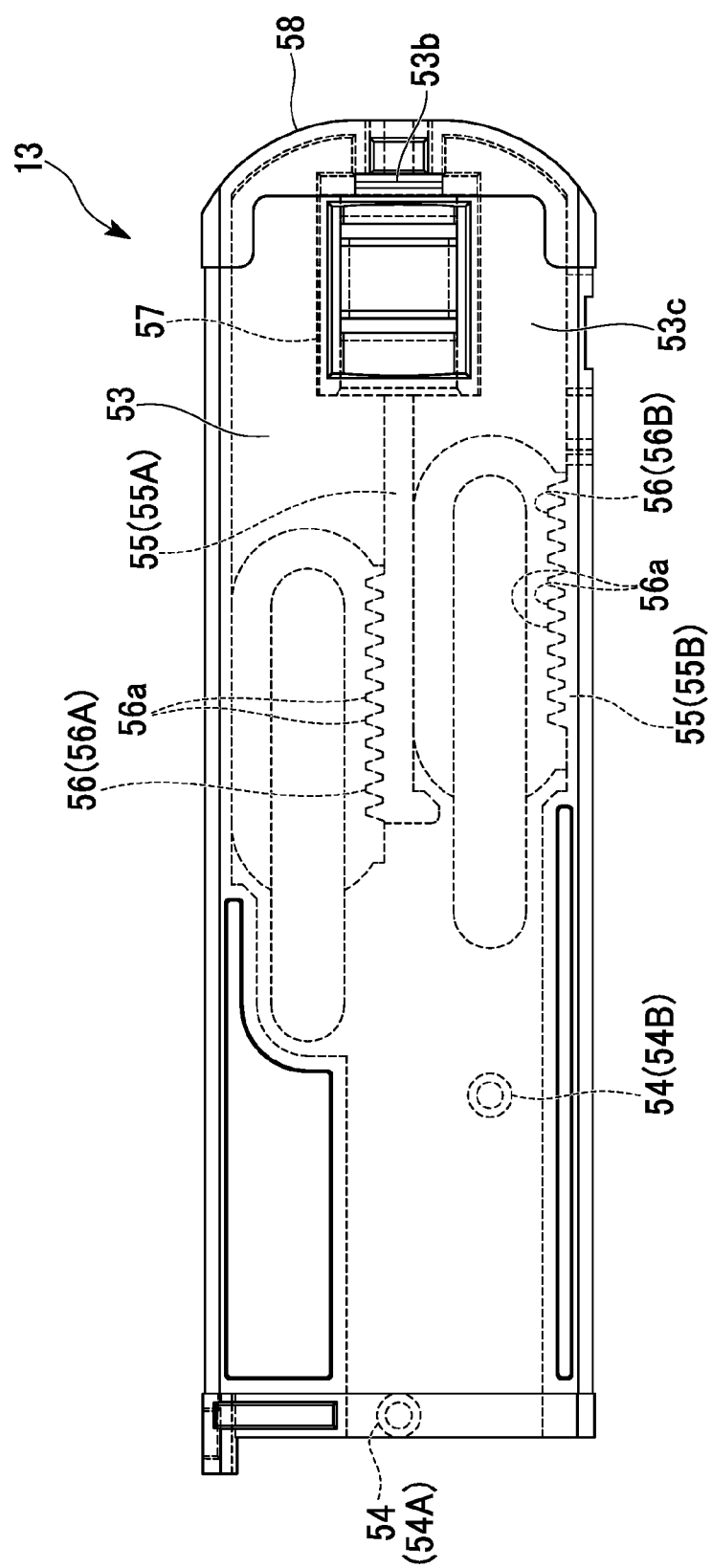
FIG. 5 is a plan view that shows the pressing body.
Figure 6:
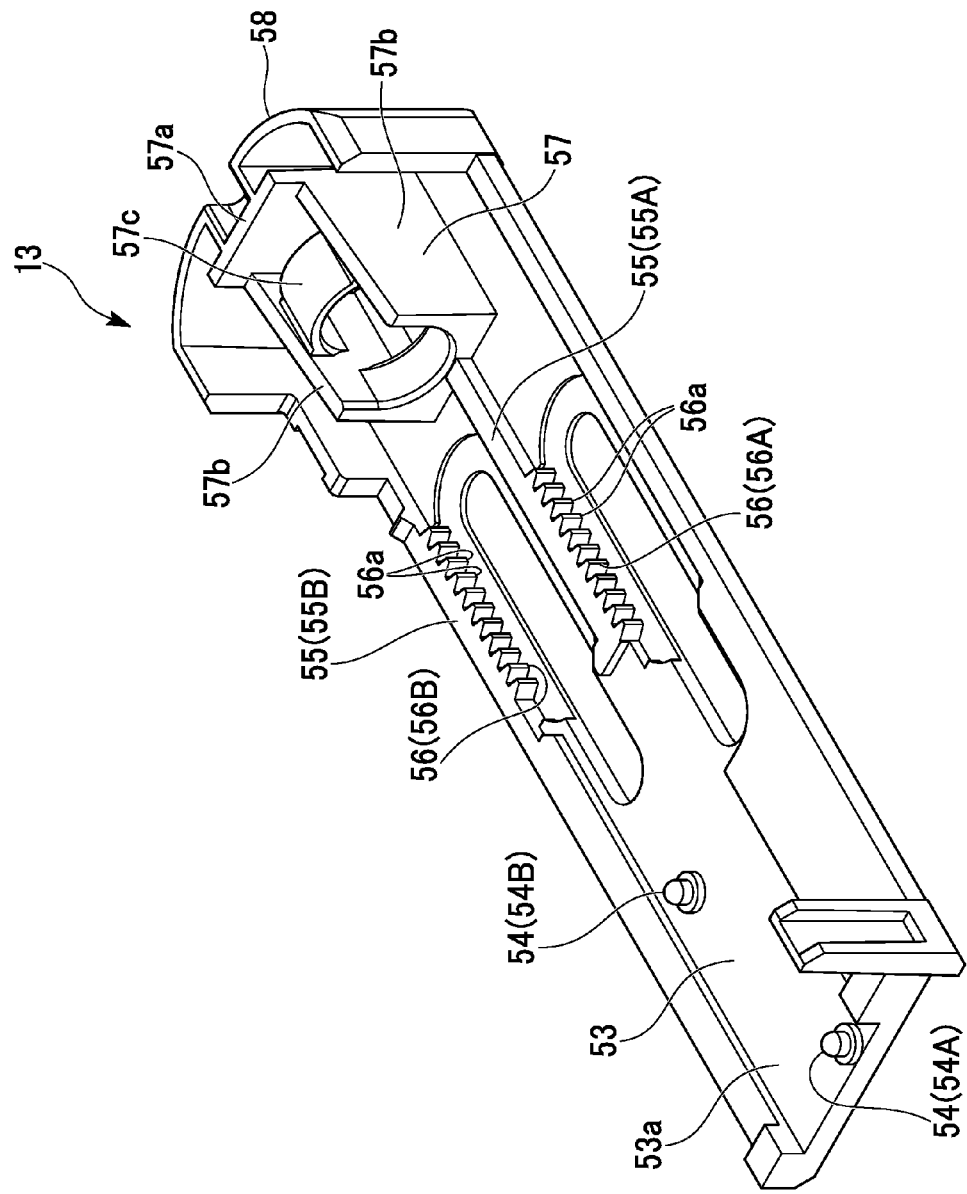
FIG. 6 is a perspective view that shows the pressing body.

As shown in FIG. 5 and FIG. 6, the pressing body 13 is provided with a rectangular plate-shaped base plate 53, insertion protrusion portions 54 (54A and 54B) that are formed to protrude in the thickness direction of the base plate 53 from an inner surface 53a of the base plate 53, a thick plate portion 55 (55B) that is formed on the side edge portion of the base plate 53 to protrude toward the interior of the pressing body 13, a thick plate portion 55 (55A) that is formed in the center portion of the base plate 53 in the width direction, a pressing portion 57 that is formed at the rear end portion of the base plate 53, and a rear end plate 58 that is formed extending from the rear end portion of the base plate 53 toward the interior of the pressing body 13.

The thick plate portions 55A and 55B extend along the lengthwise direction (front-and-back direction) of the base plate 53. Note that the width direction of the base plate 53 is a direction that is perpendicular to the front-and-back direction.

A serrated gear receiving portion 56 (56A) (driving portion) is formed on one side surface of the thick plate portion 55A (the side surface on the opposite side of the thick plate portion 55B).

The serrated gear receiving portion 56 (56B) (driving portion) is formed on the side surface of the thick plate portion 55B facing the interior of the pressing body 13.

The gear receiving portion 56 is a driving portion that rotationally drives a take-up reel 31 in a take-up direction by forward movement of the pressing body 13 with respect to the feeding mechanism 3, and has a plurality of receiving tooth portions 56a that are arranged in the lengthwise direction of the base plate 53.

Note that in the present embodiment, although the serrated gear receiving portion 56 is adopted, a constitution for driving the take-up reel 31 is not limited thereto, and provided it is capable of applying a force in the rotation direction to the take-up reel 31, other constitutions, such as a constitution of applying a force in a rotation direction to the take-up reel 31 by frictional contact with the outer circumferential edge of the take-up reel 31, for example, may be adopted.

The insertion protrusion portion 54 has an approximately cylindrical shape, and is formed to protrude in the thickness direction of the base plate 53 from the front the inner surface 53a of the base plate 53, and the protrusion height and the outer diameter are set such that the insertion protrusion portion 54 can be fitted into a cam groove 85 of a rotating tube portion 82.

Among the two insertion protrusion portions 54, the first insertion protrusion portion 54A is formed at the front end portion of the base plate 53, and is capable of being inserted in the cam groove 85 of a first rotating shaft 52A described below.

Regarding the front-and-back position of the second insertion protrusion portion 54B (the position in the lengthwise direction of the base plate 53), it is positioned further rearward than the first insertion protrusion portion 54A. The second insertion protrusion portion 54B is capable of being inserted in the cam groove 85 of the second rotating shaft 52B.

The pressing portion 57 has a pressing plate 57a that the rear end portion of a biasing portion 40 abuts, side plate portions 57b and 57b that extend to the front from both side edges of the pressing plate 57a, and a holding plate 57c suspended in an arch shape between the side plate portions 57b and 57b, and by housing the rear end portion of the biasing portion 40 in this enclosed space, it is possible to position the biasing portion 40.

The pressing plate 57a in the illustrated example is formed perpendicular to the front-and-back direction at a position near the rear end portion of the base plate 53.

Figure 1:
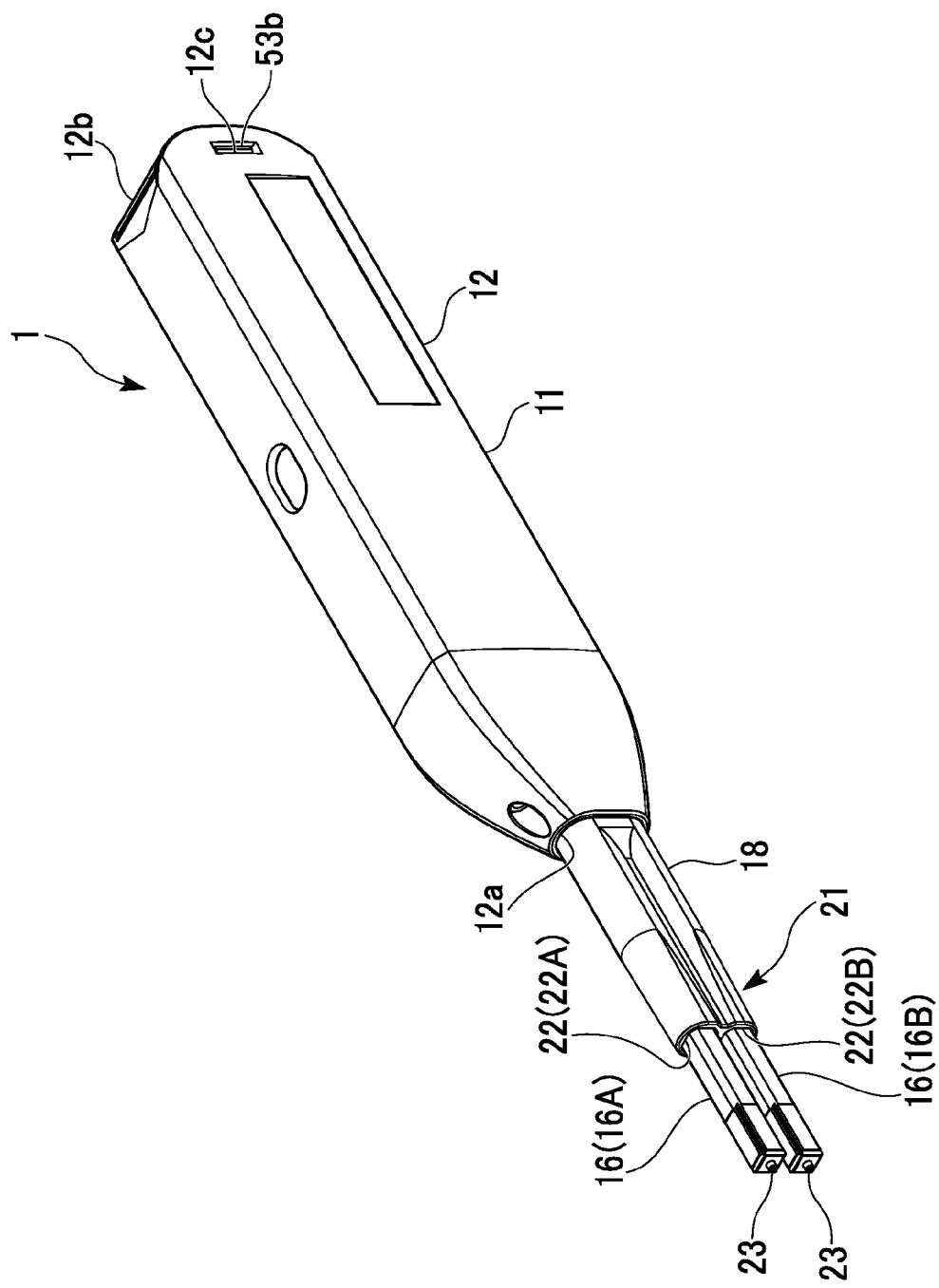
FIG. 1 is a perspective view of one embodiment of the optical connector cleaning tool of the present invention.
Figure 2:
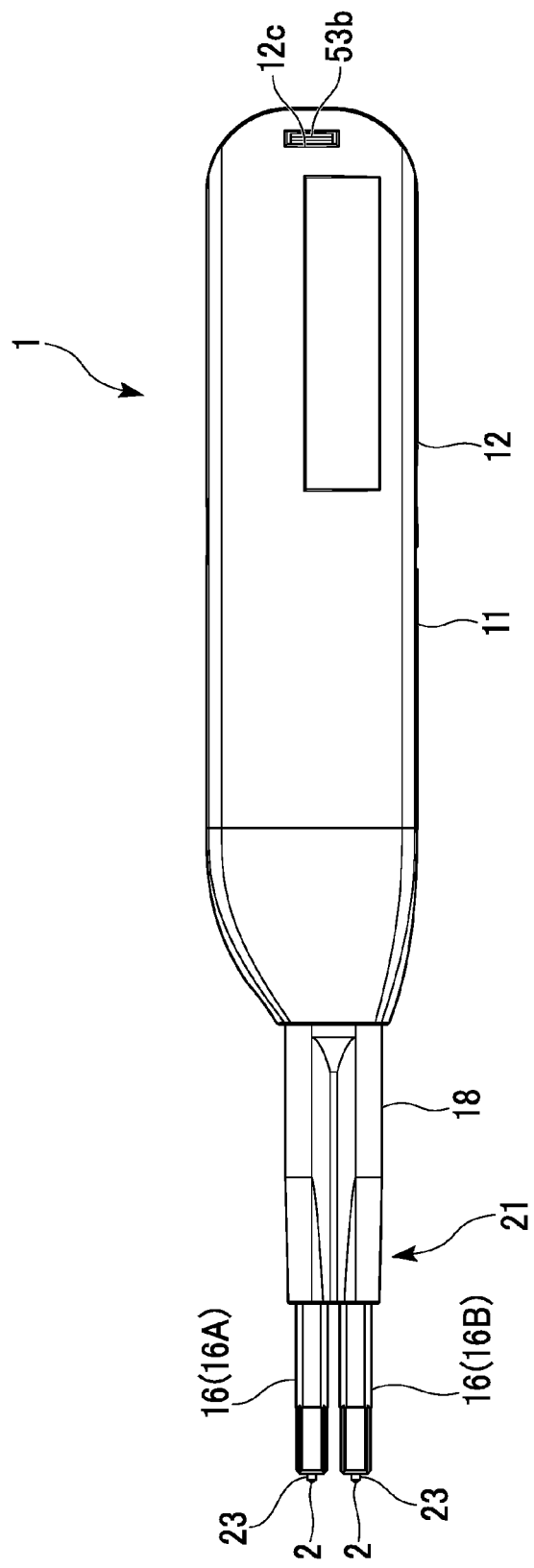
FIG. 2 is a front elevational view of the optical connector cleaning tool.
Figure 3:
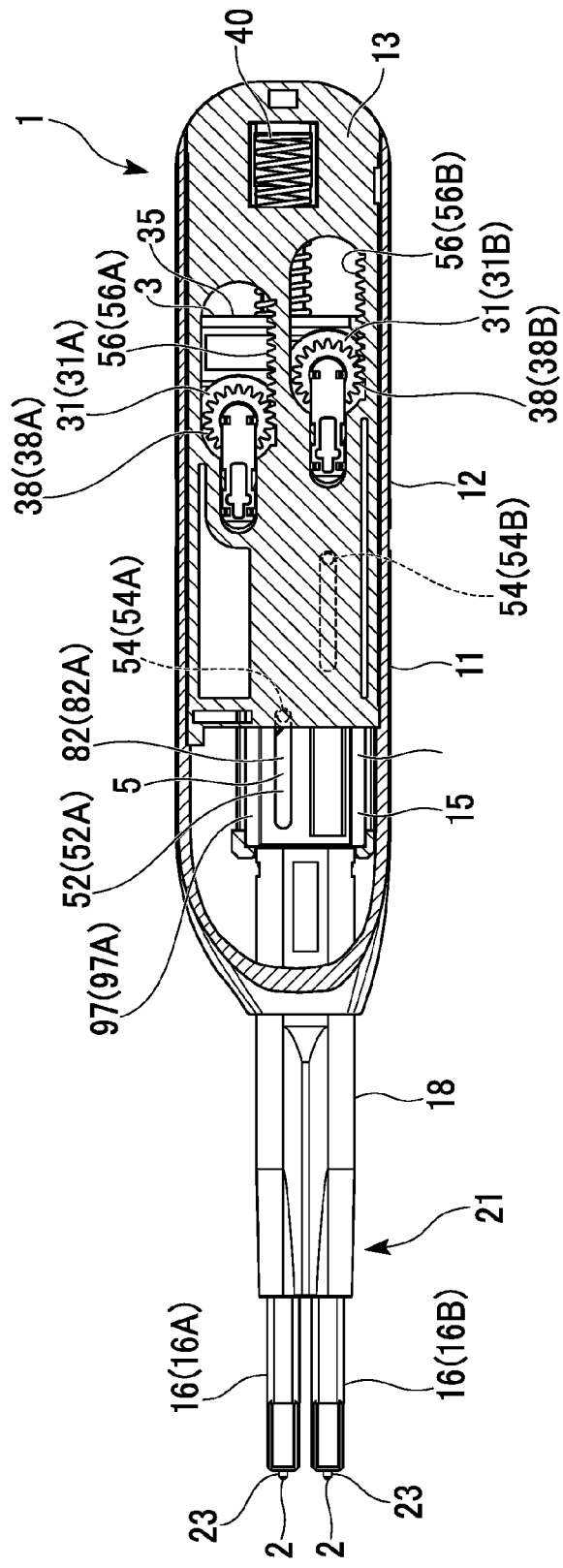
FIG. 3 is a cross-sectional view of the optical connector cleaning tool.

As shown in FIG. 1, FIG. 2, and FIG. 5, on the outer surface 53c of the base plate 53 of the pressing body 13, a locking protrusion 53b is formed protruding outward. The locking protrusion 53b is capable of locking with a locking hole 12c of the case 12.

The pressing body 13 is positioned with respect to the case portion 12 by locking of the locking protrusion 53b to the locking hole 12c, and moves together with the case portion 12.

Figure 12:
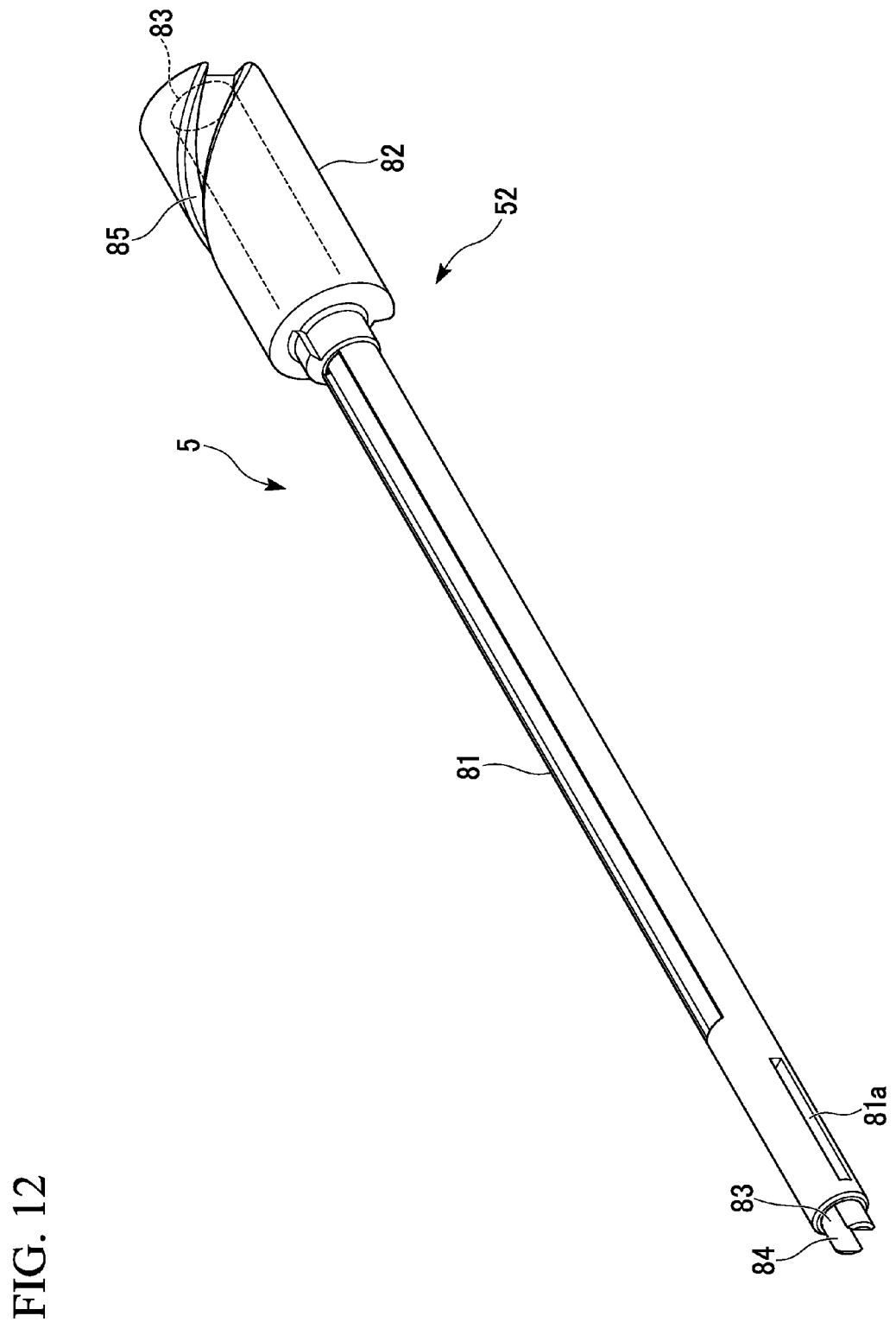
FIG. 12 is a perspective view that shows the rotation shaft.

As shown in FIG. 12, the rotation mechanism 5 is provided with a rotating shaft 52 that is rotatable about the axis thereof.

The rotating shaft 52 is provided with a rotating tube portion 82 and a guide tube portion 81 that extends forward from a front end of the rotating tube portion 82.

In the rotating shaft 52, an insertion hole 83, through which the cleaning body 2 passes, is formed over an area from a front end of the guide tube portion 81 to a rear end of the rotating tube portion 82.

The guide tube portion 81 is formed into an approximately cylindrical shape, and it is possible to insert an insertion portion 91 of the head member 23 into the insertion hole 83 of the front end portion. At the inner surface of the front end portion of the guide tube portion 81, rotation stopping portions 84 are formed in a flat shape.

The rotating tube portion 82 is formed into an approximately cylindrical shape and in the outer surface thereof, the cam groove 85, into which the insertion protrusion portion 54 of the pressing body 13 is inserted, is formed.

The cam groove 85 is formed such that at least a portion is inclined with respect to the axial direction of the rotating tube portion 82. For this reason, as will be described later, if the insertion protrusion portion 54 that is inserted into the cam groove 85 moves in the front-and-back direction, the rotating tube portion 82 moves along the cam groove 85, whereby the rotating shaft 52 rotates about the axis thereof. In FIG. 12, the cam groove 85 is formed in a helical shape.

Note that it is also possible to include the insertion protrusion portion 54 of the pressing body 13 in the rotation mechanism 5.

Since the cleaning tool 1 has two distal end tube portions 16, two rotation mechanisms 5 and two head members 23 are respectively used.

Figure 8:
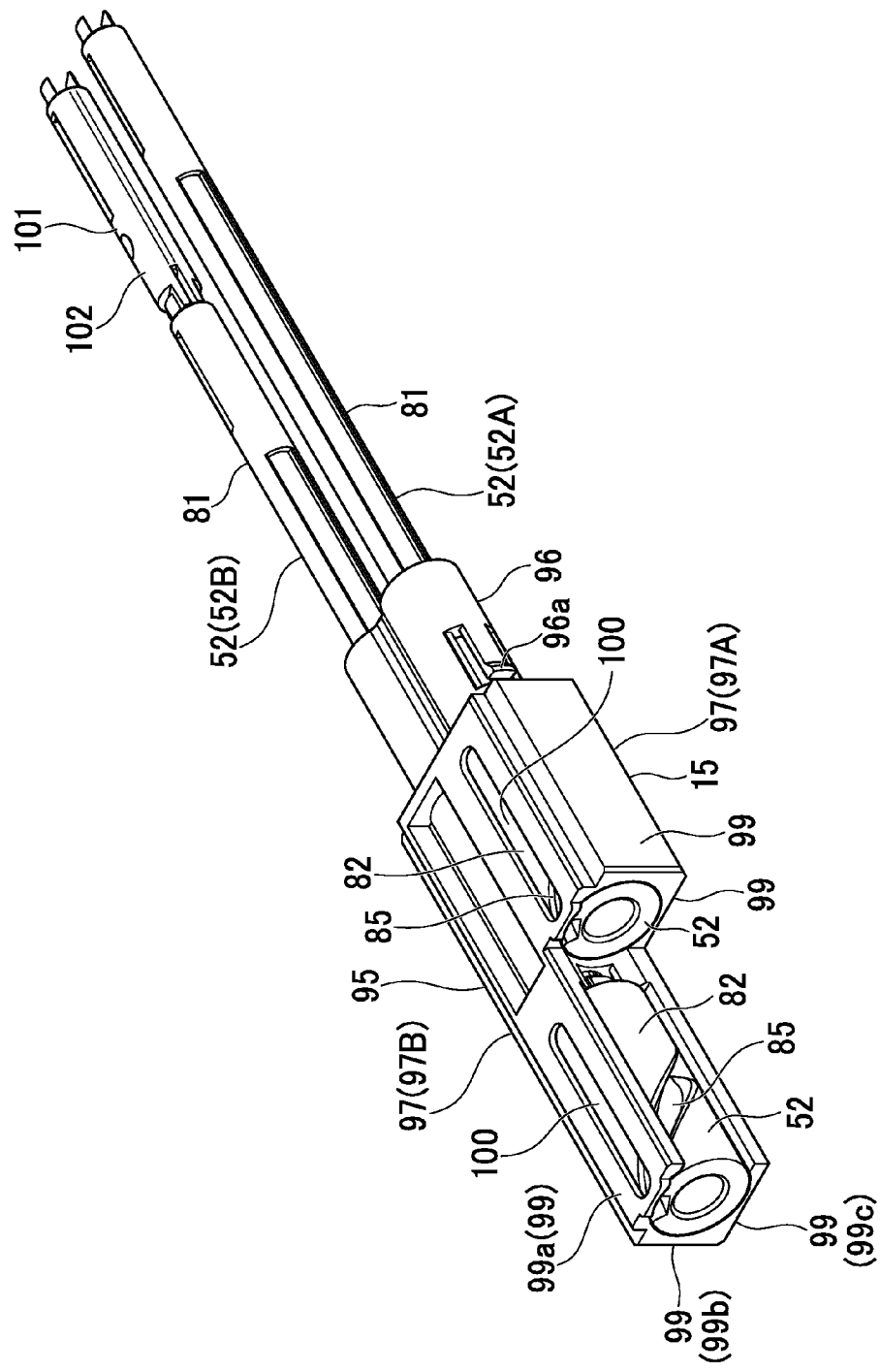
FIG. 8 is a perspective view that shows a portion of the extension portion.

As shown in FIG. 8, since the two rotating shafts 52 are provided with their positioned staggered in the front-and-back direction, the distal end of the guide tube portion 81 of the second rotating shaft 52B among the two rotating shafts 52 is positioned more to the rear compared to the distal end of the guide tube portion 81 of the first rotating shaft 52A.

For this reason, at the distal end of the second rotating shaft 52B, it is preferable to provide the aforementioned adjusting member 101 in order to adjust the attachment position of the head member 23.

Figure 13:
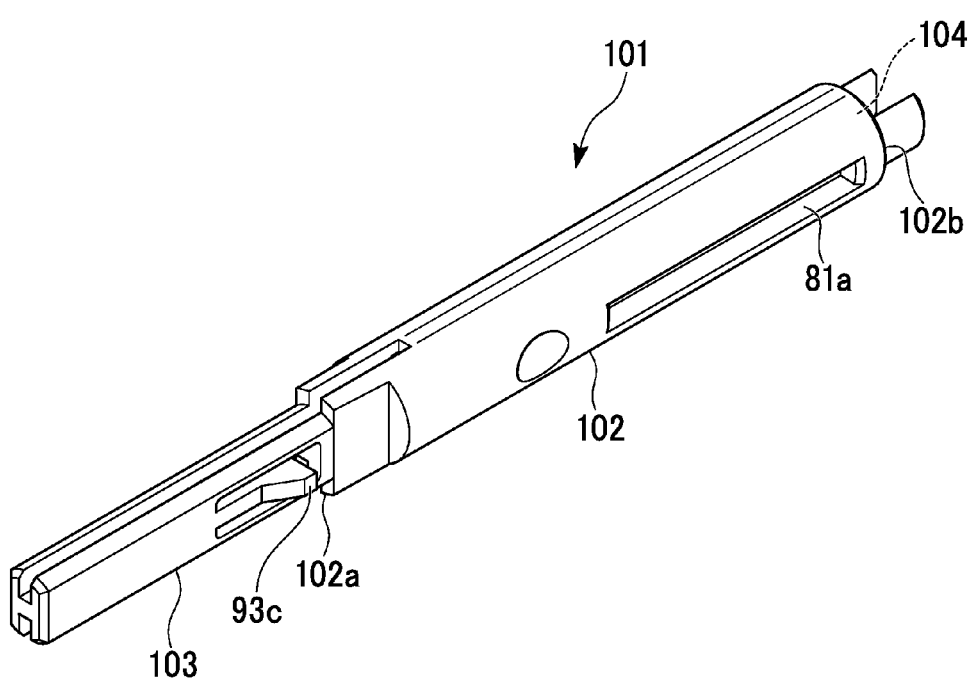
FIG. 13 is a perspective view that shows the adjusting member.

As shown in FIG. 8 and FIG. 13, the adjusting member 101 is provided with a cylindrical main body portion 102 that has an insertion hole 104, and an insertion portion 103 that extends from a rear end portion 102a of the main body portion 102.

The insertion portion 103 should have the same structure as the insertion portion 91 of the head member 23. The insertion portion 103 is capable of being inserted from the distal end of the guide tube portion 81 of the rotating shaft 52 (52B) into the insertion hole 83.

An engagement opening portion 81a is formed in the main body portion 102.

It is possible to mount the head member 23 in the front end portion 102b of the main body portion 102 by inserting the insertion portion 91 in the insertion hole 104.

By using the adjusting member 101, it is possible to adjust the positional offset in the front-and-back direction of the head member 23 that is inserted in the first distal end tube portion 16A and the head member 23 that is inserted in the second distal end tube portion 16B.

Figure 11:
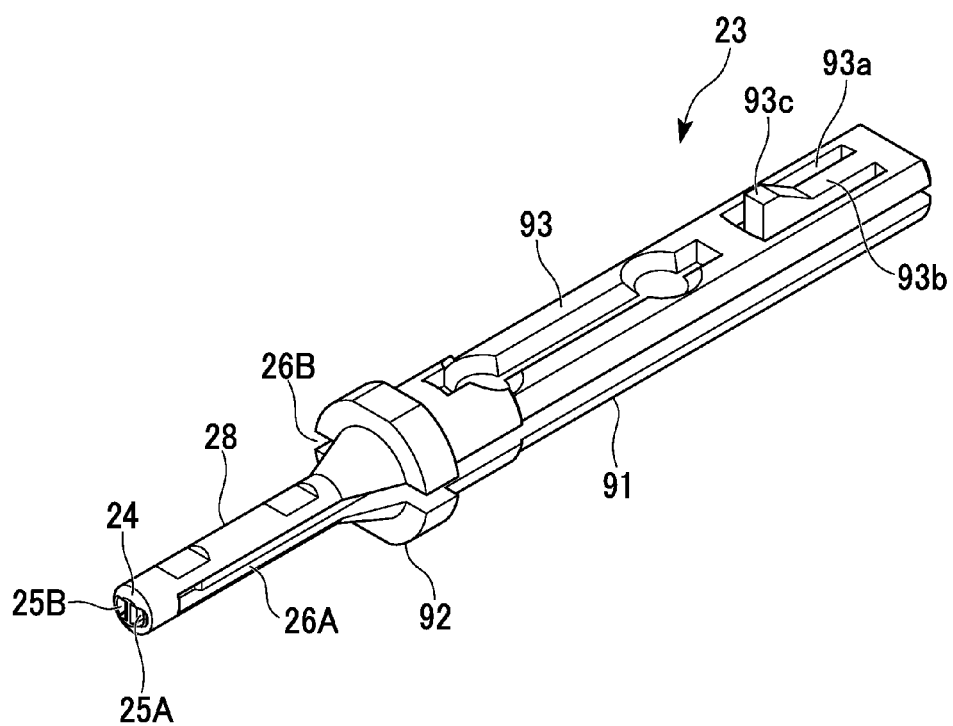
FIG. 11 is a perspective view that shows the head member.
Figure 14:
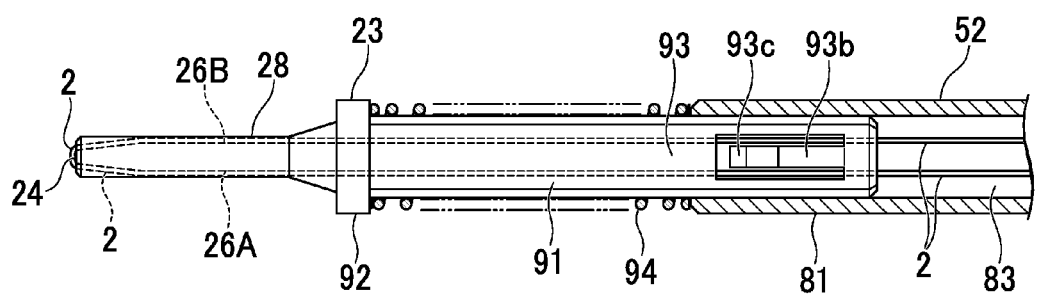
FIG. 14 is a plan view of the partial cross-sectional state that shows the rotating shaft and the head member that is attached to the distal end thereof.

As shown in FIG. 11 and FIG. 14, the head member 23 is provided with the insertion portion 91 capable of being inserted into the insertion hole 83 of the guide tube portion 81, a flange portion 92 formed at a front end of the insertion portion 91, and an approximately cylindrical distal end extension portion 28 that extends forward from the front face of the flange portion 92.

Figure 26:
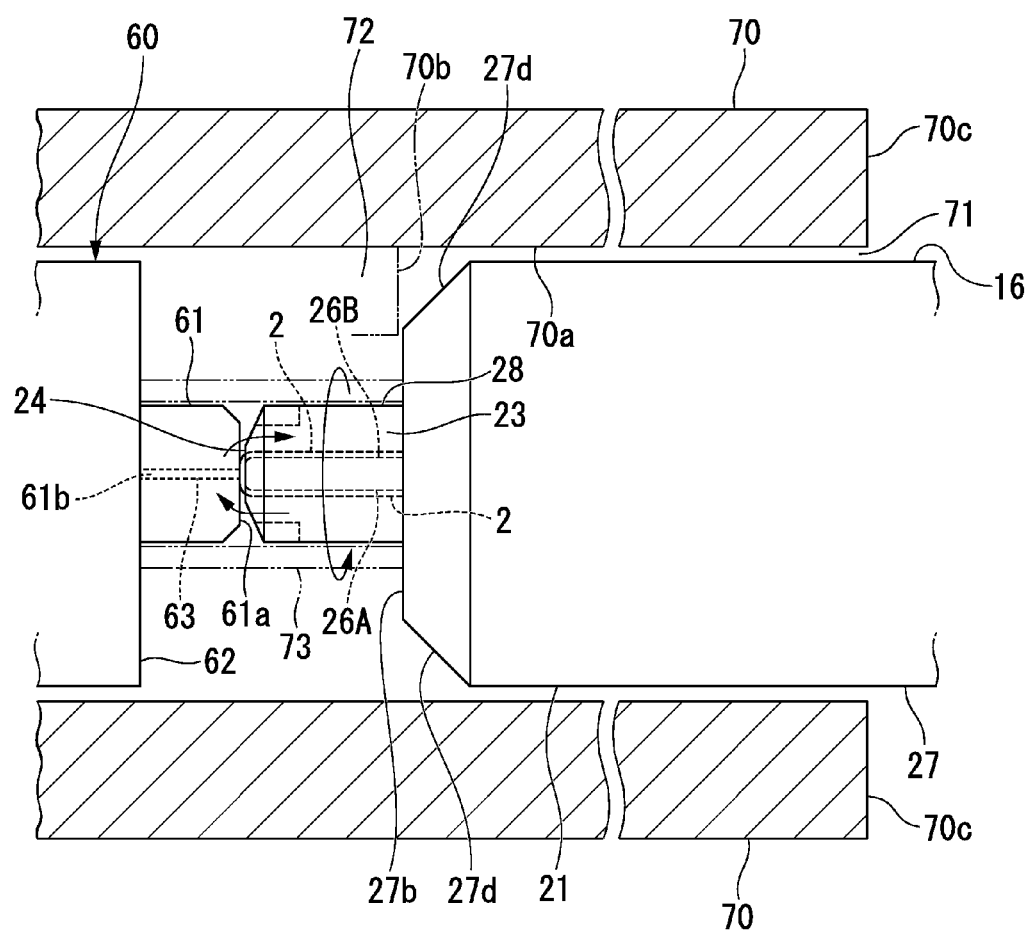
FIG. 26 is a process drawing that shows the method of using the optical connector cleaning tool.

The distal end face of the distal end extension portion 28 becomes a pressing face 24 that presses the cleaning body 2 against a joining end face 61a (refer to FIG. 26).

In the pressing face 24, guide opening portions 25A and 25B (guide portions) that are opening portions, through which the cleaning body 2 passes, are formed.

The guide opening portion 25A is for leading the cleaning body 2 fed from the feeding mechanism 3 to the pressing face 24, and the guide opening portion 25B is for leading the cleaning body 2 passed through the pressing face 24 to the feeding mechanism 3. Deviation of the cleaning body 2 from the pressing face 24 can be prevented by the guide opening portions 25A and 25B.

In the side face of the distal end extension portion 28, it is preferable to form guide grooves 26A and 26B that guide feeding movement of the cleaning body 2. The guide grooves 26A and 26B are also formed in the side portions of the flange portion 92 and the insertion portion 91.

At the insertion portion 91, a flat portion 93 of a shape that is adapted to the rotation stopping portion 84 formed at the guide tube portion 81 is formed, and the flat portion 93 is disposed along the rotation stopping portion 84. For this reason, the head member 23 does not rotate with respect to the guide tube portion 81. In FIG. 11, the flat portions 93 are formed on the faces on one side (top) and the other side (bottom) of the insertion portion 91.

An opening portion 93a is formed in the rear portion of the flat portion 93 on one side of the insertion portion 91, and an elastic piece 93b extending forward is formed at the rear edge of the opening portion 93a. An engagement claw 93c that protrudes with respect to the flat portion 93 is formed at a distal end of the elastic piece 93b.

Figure 15:
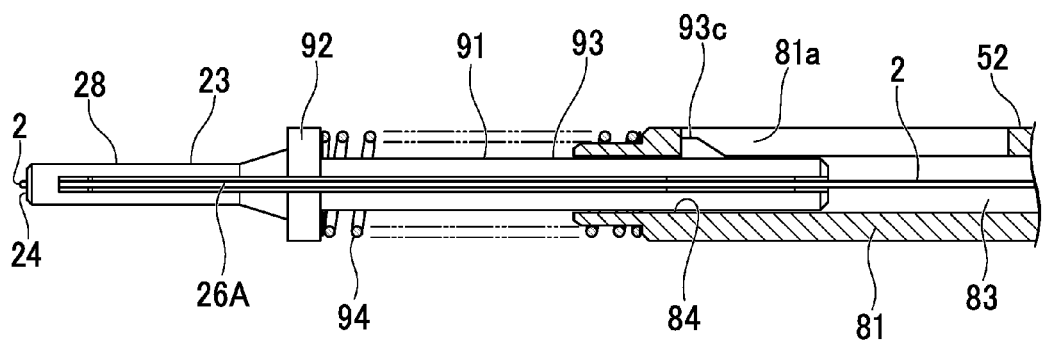
FIG. 15 is a side elevational view of a partial cross-sectional state that shows the rotating shaft and the head member that is attached to the distal end thereof.

As shown in FIG. 15, the engagement claw 93c can be locked to the front edge of an engagement opening portion 81a (an engagement concave portion) formed in the guide tube portion 81, and by locking of the engagement claw 93c to the front edge of the engagement opening portion 81a, forward movement of the head member 23 is regulated, so that falling-off of the head member 23 can be prevented.

Figure 16:
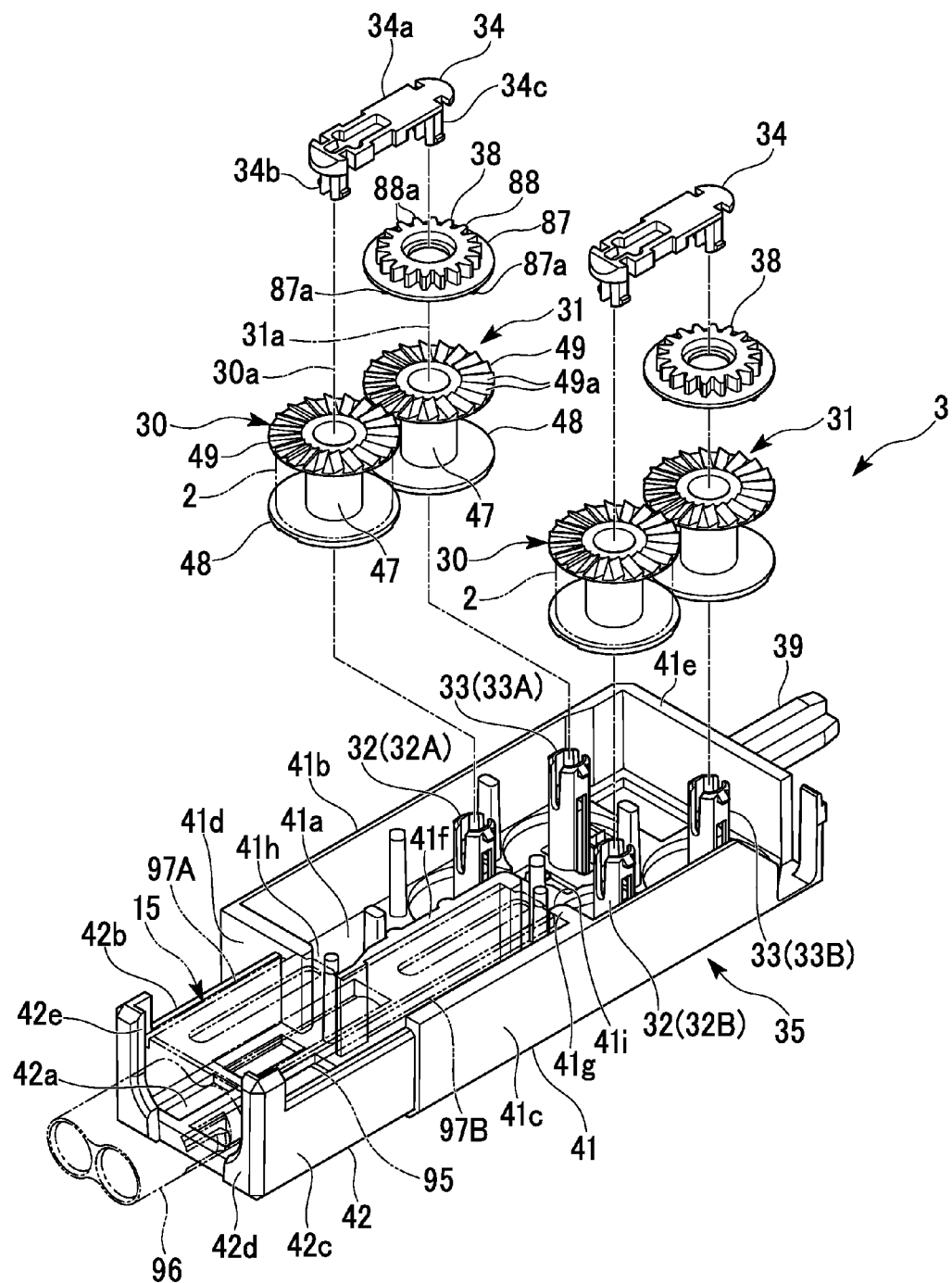
FIG. 16 is an exploded perspective view that shows the feeding mechanism.

As shown in FIGS. 14 to 16, the cleaning body 2 that is drawn from a supply reel 30 is wound on the head member 23.

In FIGS. 14 to 16, the cleaning body 2 passes the insertion hole 83 of the rotating shaft 52 from the supply reel 30 and then reaches the pressing face 24 through the guide groove 26A and the guide opening portion 25A of the head member 23. Then, the cleaning body 2 passes the guide opening portion 25B and the guide groove 26B from the pressing face 24 and then reaches the take-up reel 31 through the interiors of the guide tube portion 81 and the insertion hole 83.

The cleaning body 2 is not particularly limited and one made by processing a publically known suitable cleaning fabric (such as nonwoven fabric or woven fabric) into a thread form (or a string form), a tape form, or the like can be adopted. As the cleaning body 2, for example, one composed of ultrafine fibers such as polyester or nylon can be exemplified.

A reference numeral 94 in FIGS. 14 and 15 denotes a biasing portion (for example, a spring member such as a coil spring) that is provided between the front end of the guide tube portion 81 and the flange portion 92. The biasing member 94 biases forward the head member 23 when the head member 23 has been pressed against the joining end face 61a.

Figure 17:
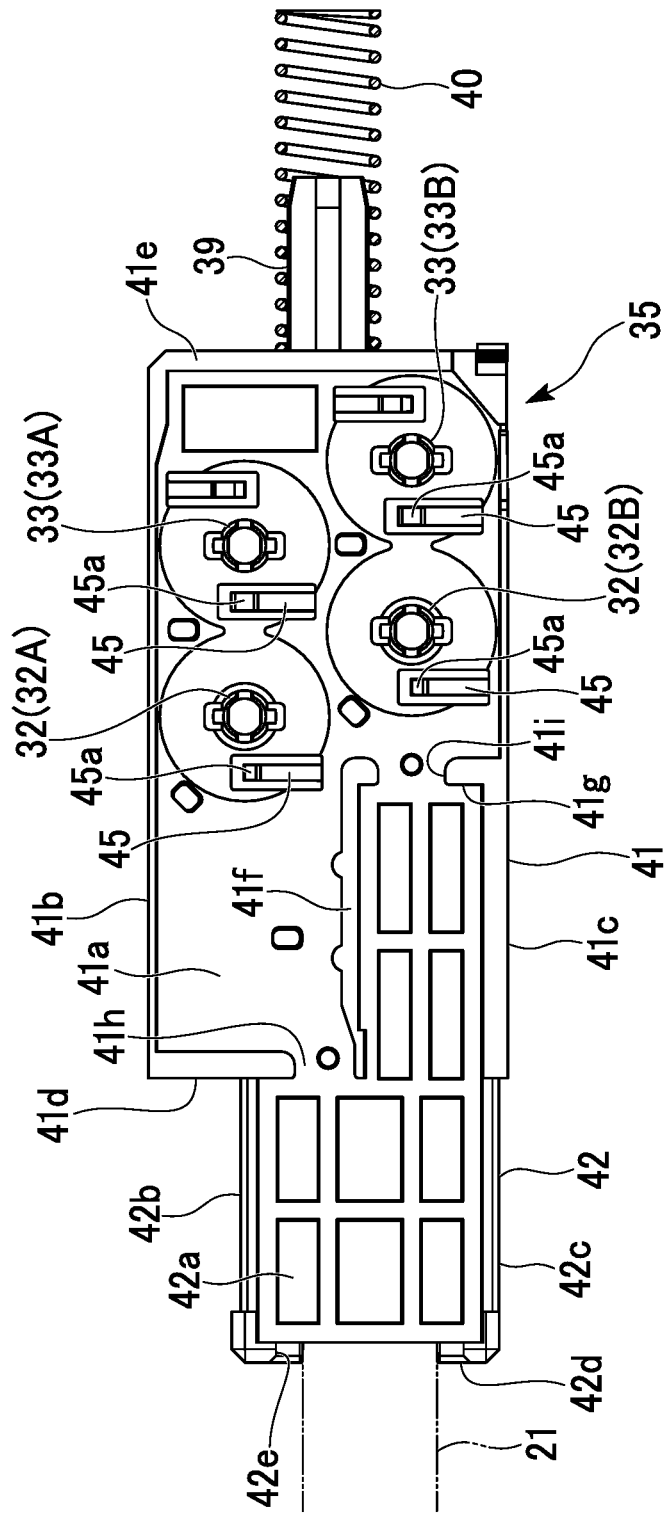
FIG. 17 is a plan view that shows the support body of the feeding mechanism.

As shown in FIG. 16 and FIG. 17, the feeding mechanism 3 is provided with the supply reel 30 (a supply portion) on which the cleaning body 2 is wound, the take-up reel 31 (a take-up portion) that takes up and collects the cleaning body 2 after use, a supporting body 35 that rotatably supports the reels, a gear 38 that is mounted on the take-up reel 31, and a pressing portion 34.

The supporting body 35 includes a main holding portion 41, and a front side holding portion 42 that is formed extending forward at the front surface of the main holding portion 41.

The main holding portion 41 is provided with a bottom plate 41a that is approximately rectangular in plan view, supply reel support shafts 32 (32A and 32B) that are provided on the bottom plate 41a to rotatably support the supply reels 30 (30A and 30B), take-up reel support shafts 33 (33A and 33B) that rotatably support the take-up reels 31 (31A and 31B), side plates 41b and 41 c that are formed at both side edge portions of the bottom plate 41a, a front end plate 41d that is formed at the front end portion of the bottom plate 41a, and a rear end plate 41e that is formed at the rear end portion of the bottom plate 41a.

Partition plates 41f and 41g are formed between both side plated 41b and 41c. The partition plate 41f is formed nearly parallel with the side plates 41b and 41c from the front portion of the bottom plate 41a to an intermediate position in the front-and-back direction. The partition plate 41g is formed perpendicular to the partition plate 41f from the rear end of the partition plate 41f to the side plate 41c.

The space that is formed by the partition plates 41f and 41g and the side plate 41c is capable of housing a second holding frame portion 97B. The partition plate 41g can regulate backward movement of the second holding frame portion 97B. A passage portion 41i through which the cleaning body 2 passes is formed in the rear end plate 41e.

A passage portion 41h through which the second holding frame portion 97B is capable of passing is formed in the front end plate 41d. The front end plate 41d can regulate backward movement of a first holding frame portion 97A.

On the rear surface of the rear end plate 41e, a holding protrusion 39 that is inserted into the biasing portion 40 to position the biasing portion 40 is formed protruding backward.

The front side holding portion 42 is provided with a bottom plate 42a that is approximately rectangular in plan view, side plates 42b and 42c that are formed at both side edge portions of the bottom plate 42a, and a front end plate 42d that is formed at the front end portion of the bottom plate 42a.

The space that is enclosed by the side plates 42b and 42c, the front end plate 42d, and the front end plate 41d is capable of housing a first holding frame portion 97A and a base frame portion 95.

A passage portion 42e through which a connection tube portion 96 can pass is formed in the front end plate 42d.

The front end plate 42d can regulate forward movement of the first holding frame portion 97A and a base frame portion 95.

The two supply reel support shafts 32 (32A and 32B) are formed at mutually offset positions, not on the same straight line, in the width direction of the base plate 41a (in the direction perpendicular to the front-and-back direction). In the figure, the first supply reel support shaft 32A is formed at a position closer to the first side plate 41b than the center position in the width direction, while the second supply reel support shaft 32B is formed at a position closer to the second side plate 41c than the center position in the width direction.

For this reason, the first supply reel 30A and the second supply reel 30B are arranged at mutually offset positions, not on the same straight line, in the width direction.

The two supply reel support shafts 32 (32A and 32B) are also formed at mutually offset positions, not on the same straight line, in the front-and-back direction. In the figure, the first supply reel support shaft 32A is formed at a position closer to the front compared to the second supply reel support shaft 32B.

For this reason, the first supply reel 30A is arranged at a position closer to the front than the second supply reel 30B.

The two take-up reel support shafts 33 (33A and 33B) are formed at mutually offset positions, not on the same straight line, in the width direction of the base plate 41a (in the direction perpendicular to the front-and-back direction). In the figure, the first take-up reel support shaft 33A is formed at a position closer to the first side plate 41b than the center position in the width direction, while the second take-up reel support shaft 33B is formed at a position closer to the second side plate 41c than the center position in the width direction.

The two take-up reel support shafts 33 (33A and 33B) are also formed at mutually offset positions, not on the same straight line, in the front-and-back direction. In the figure, the first take-up reel support shaft 33A is formed at a position closer to the front compared to the second take-up reel support shaft 33B.

For this reason, the first take-up reel 31A is arranged at a position closer to the front than the second take-up reel 31B.

Note that 30a is the central axis of the supply reels 30, while 31a is the central axis of the take-up reels 31.

According to a structure with an arrangement in which the positions of the supply reels 30A and 30B in the front-and-back direction are mutually offset as mentioned above and not on the same straight line, it is possible to bring the positions thereof close to each other in the width direction thereof without causing the supply reels 30A and 30B to interfere with each other. Also, according to a structure with an arrangement in which the positions of the take-up reels 31A and 31B in the front-and-back direction are mutually offset as mentioned above and not on the same straight line, it is possible to bring the positions thereof close to each other in the width direction thereof without causing the take-up reels 31A and 31B to interfere with each other.

Accordingly, it is possible to reduce the dimension of the supporting body 35 in the width direction, and thereby miniaturize the cleaning tool 1.

At the bottom plate 41a, two extension plates 45 that extend perpendicularly to the diameter directions of the reels 30 and 31 are formed. At the distal ends of these extension plates 45, locking claws 45a and 45a that respectively protrude toward the reels 30 and 31 are formed. The extension plates 45 can perform elastic bending deformation. The locking claws 45a can move in a direction in which each locking claw 45a approaches and is separated from each of the reels 30 and 31.

The pressing portion 34 prevents falling-off of the reels 30 and 31 and the gear 38. At the front end and rear end of a plate-like main body portion 34a that extends in the front-and-back direction of the pressing portion 34, fitting portions 34b and 34c that can be fitted into the reel support shafts 32 and 33 are formed.

Each of the supply reel 30 and the take-up reel 31 has a barrel portion 47, around which the cleaning body 2 is wrapped, a first end plate 48 that is provided at one end of the barrel portion 47, and a second end plate 49 that is provided at the other end of the barrel portion 47.

On the outer surface of the first end plate 48, a plurality of locking concave portions (not shown) arranged along a circumferential direction are formed. The locking claws 45a of the extension plates 45 are engaged with the locking concave portions, whereby rotation in a reverse direction of the reels 30 and 31 is prevented. On the outer surface of the second end plate 49, a plurality of locking convex portions 49a arranged along a circumferential direction are formed.

The reels 30 and 31 are rotatably mounted on the supporting body 35 by inserting each of the support shafts 32 and 33 into each barrel portion 47.

The gear 38 has a disc-shaped base plate 87 and a toothed wheel portion 88 formed on the first surface of the base plate 87. On the second surface of base plate 87, locking protrusions 87a which are locked to the locking convex portions 49a of the take-up reel 31 are formed.

The toothed wheel portion 88 has a plurality of tooth portions 88a that are arranged along the circumferential direction thereof. The plurality of tooth portions 88a mesh with the receiving tooth portions 56a of the gear receiving portion 56 of the pressing body 13.

The gear 38 is installed to be superposed on the second end plate 49 of the take-up reel 31. Since the locking protrusions 87a of the base plate 87 are locked to the locking convex portions 49a of the second end plate 49, the take-up reel 31 also rotates in accordance with rotation of the gear 38.

In a case where the gear 38 rotates in the opposite direction to a take-up direction, the locking protrusions 87a are not locked to the locking convex portions 49a.

Figure 4:
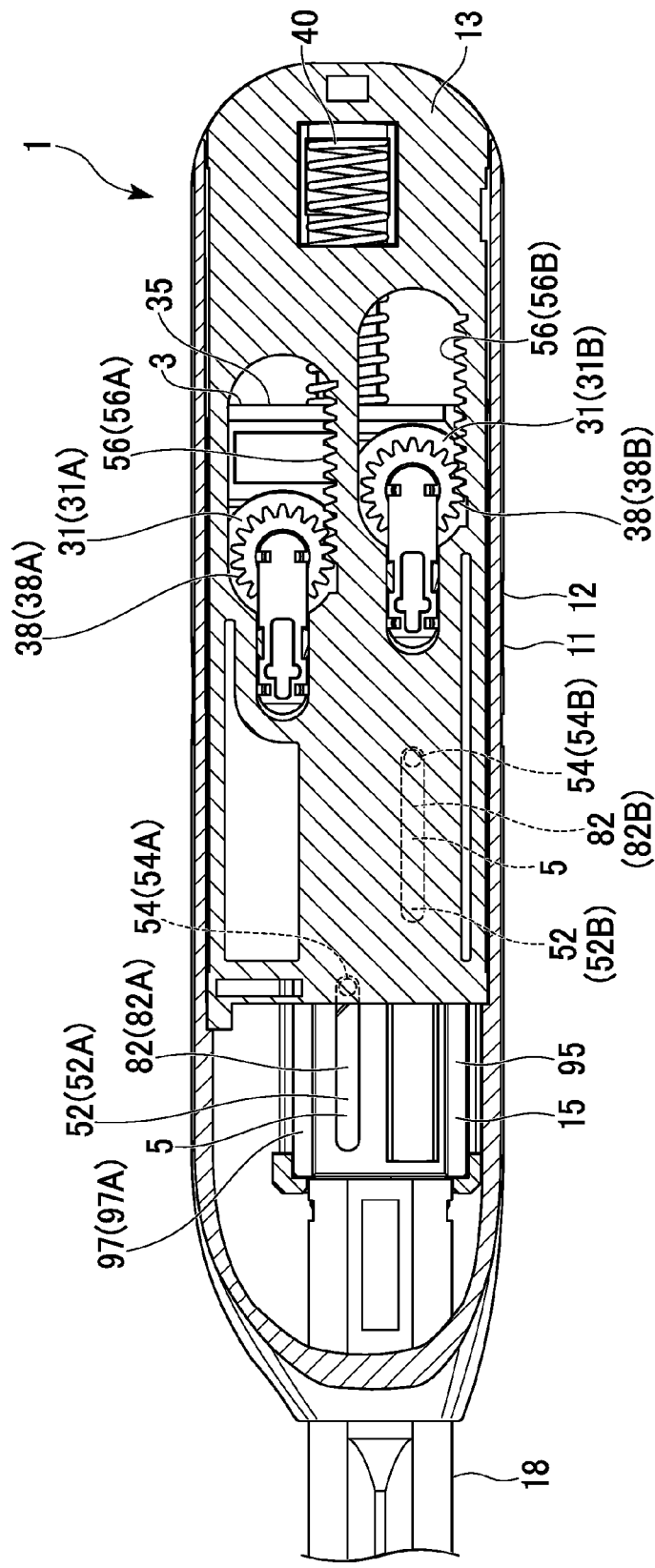
FIG. 4 is an enlarged cross-sectional view of the optical connector cleaning tool.

As shown in FIGS. 4 and 17, the biasing portion 40 biases backward the housing body 11 which is in a state of having relatively moved forward. In this case, as the biasing portion 40, a spring member such as a coil spring is suitable.

The biasing portion 40 can bias backward the housing body 11 by taking the reaction force of the supporting body 35. Specifically, the biasing portion 40 can bias backward the pressing portion 57 of the pressing body 13 by taking a reaction force of the front end plate 41e.

Figure 7:
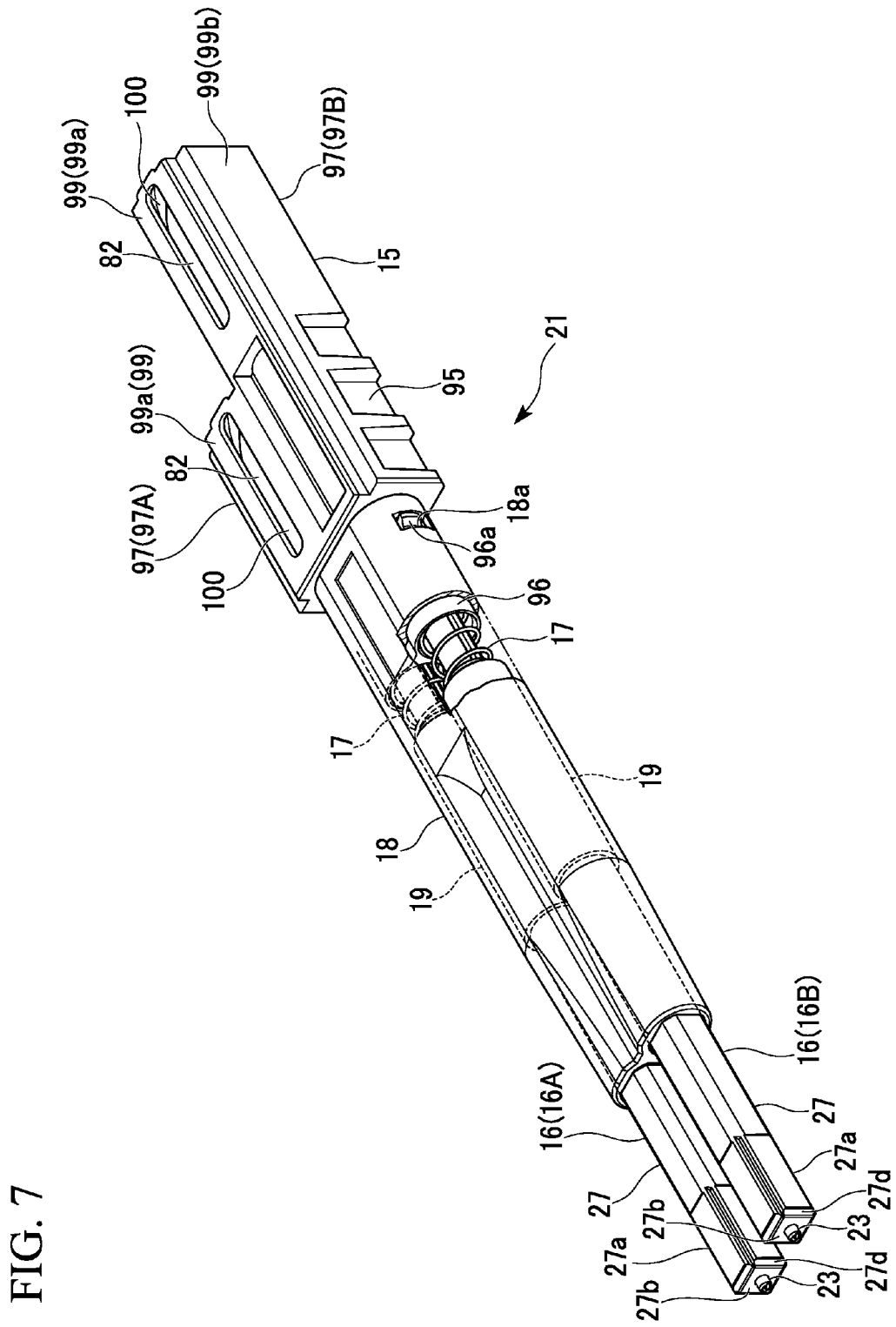
FIG. 7 is a perspective view that shows the extension portion.

As shown in FIG. 7 and FIG. 8, the extension portion 21 is provided with a tube body base portion 15, two distal end tube portions 16 (16A and 16B) provided at the extension portion 21, a biasing portion 17 that biases forward the distal end tube portions 16, and an outer tube body 18 into which the distal end tube portions 16 is inserted.

The tube body base portion 15 is provided with the base frame portion 95, two holding frame portions 97 (97A and 97B) formed at the base frame portion 95, and a cylindrical connection tube portion 96 that extends forward.

The holding frame portion 97 is formed into a tube shape having a rectangular cross section and can house the rotating tube portion 82 of the rotating shaft 52 in the inside thereof.

In a side plate 99a that is one of the side plates 99 constituting the holding frame portion 97, a slit 100, into which the insertion protrusion portion 54 of the pressing body 13 is inserted, is formed along the front-and-back direction.

The first holding frame portion 97A among the two holding frame portions 97 (97A and 97B) is formed at the side portion of the base frame portion 95, while the second holding frame portion 97B is formed extending rearward from the rear end portion of the base frame portion 95. For this reason, the two holding frame portions 97 (97A and 97B) are formed at mutually offset positions in the width direction and the front-and-back direction.

Specifically, the first holding frame portion 97A is arranged at a position closer to the front than the second holding frame portion 97B.

It is difficult to reduce the diameter of the rotating tube portion 82 in consideration of the torque required for causing rotation. However, in the cleaning tool 1, the positions in the front-and-back direction of the two holding frame portions 97 (97A and 97B) are not on the same straight line, but at mutually offset positions. Accordingly, without causing mutual interference of the two rotating tube portions 82 and 82 that are housed in the holding frame portions 97 (97A and 97B), it is possible to bring their positions in the width direction close together.

Accordingly, it is possible to reduce the dimension of the tube body base portion 15 in the width direction, and thereby miniaturize the cleaning tool 1.

The connection tube portion 96 is made to be an approximately cylindrical shape into which the guide tube portions 81 and 81 of the rotating shafts 52 and 52, of which the rotating tube portions 82 have been housed in the holding frame portions 97 (97A and 97B), can be inserted.

The connection tube portion 96 can be inserted on the outer tube body 18 from the rear end side. On the outer surface of the connection tube portion 96, a fitting claw 96a which is fitted from the inner surface side into a locking opening portion 18a formed in the outer tube body 18 is formed.

As shown in FIG. 8, the second holding frame portion 97B has a frame shape in which the interior is opened.

The second holding frame portion 97B that is shown in FIG. 8 has an approximate C-shape in cross section consisting of three side plates 99, namely an outer side plate 99b, a side plate 99a that extends from one side edge of the outer side plate 99b in the interior direction, and a side plate 99c that extends from the other side edge of the outer side plate 99b in the interior direction.

Since the second holding frame portion 97B has a shape in which its interior is open, compared to a structure in which there is a side plate also on the inner side surface side, it is possible to arrange to two rotating tube portions 82 closer together within the second holding frame portion 97B.

Accordingly, it is possible to reduce the dimension of the supporting body 15 in the width direction, and thereby miniaturize the cleaning tool 1.

Figure 22:
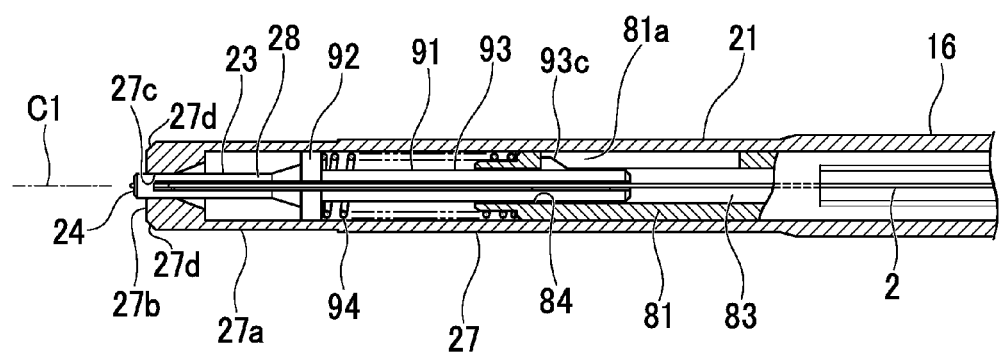
FIG. 22 is a process drawing that shows the operation of the head member.

As shown in FIG. 7 and FIG. 22, the distal end tube section 16 is composed of a cylindrical large diameter portion 19 and a fine diameter portion 27 which extends forward from a front end of the large diameter portion 19.

The fine diameter portion 27 has a tubular wall portion 27*a* and a distal end wall portion 27*b* that is provided at a front end of the tubular wall portion 27*a*. In the illustrated example, in the fine diameter portion 27, the tubular wall portion 27*a* having an approximately rectangular cross section extends backward from the peripheral edge of the approximately rectangular plate-like distal end wall portion 27*b*.

A distal end portion of the tubular wall portion 27*a* has a cross-sectional shape corresponding to a connector receiving hole 72 (refer to FIG. 26) of an optical adapter 70 that is to be cleaned.

In addition, the cross-sectional shape of the tubular wall portion 27*a* is not limited to a rectangular shape, but may be a circular shape, a polygonal shape, or the like.

At the circumferential edge portion of the distal end wall portion 27*b*, a sloped surface 27*d* that is sloped toward the distal end direction in a direction gradually approaching the center axis C1 of the distal end tube portion 16 is formed. When inserting the distal end tube portion 16 in the connector receiving hole 72, the sloped surface 27*d* abuts the opening end portion 70*c* of the optical adapter 70 (refer to FIG. 26) and can guide the distal end tube portion 16 to the position of being insertable in the connector receiving hole 72.

In the illustration, the sloped surface 27*d* is formed along the entire circumferential edge portion of the distal end wall portion 27*b*, but it is not limited thereto, and it may be formed only at portions corresponding to the movement direction of the distal end tube portion 16. For example, in the example shown in FIG. 10, FIG. 27, and FIG. 28, in the case of the distal end tube portion 16 being movable in both left and right directions, the sloped surface 27*d* may be formed only on the left and the right side of the distal end wall portion 27*b*.

In the distal end wall portion 27*b*, a passing-through opening portion 27*c*, through which the distal end extension portion 28 of the head member 23 passes, is formed. In the illustrated example, the passing-through opening portion 27*c* is made to be a circular shape that is adapted to the cross-sectional shape of the cylindrical distal end extension portion 28.

The distal end tube section 16 is movable in an extending direction (a distal end direction) and the opposite direction thereto.

As shown in FIG. 7, as the biasing member 17, a spring member such as a coil spring is suitable.

A rear portion of the biasing member 17 is inserted into the connection tube portion 96, whereby a rear end portion of the biasing member 17 can come into contact with the step portion (not shown). A front end portion of the biasing member 17 can come into contact with a rear end portion of the large diameter portion 19 of the distal end tube section 16.

Figure 9:
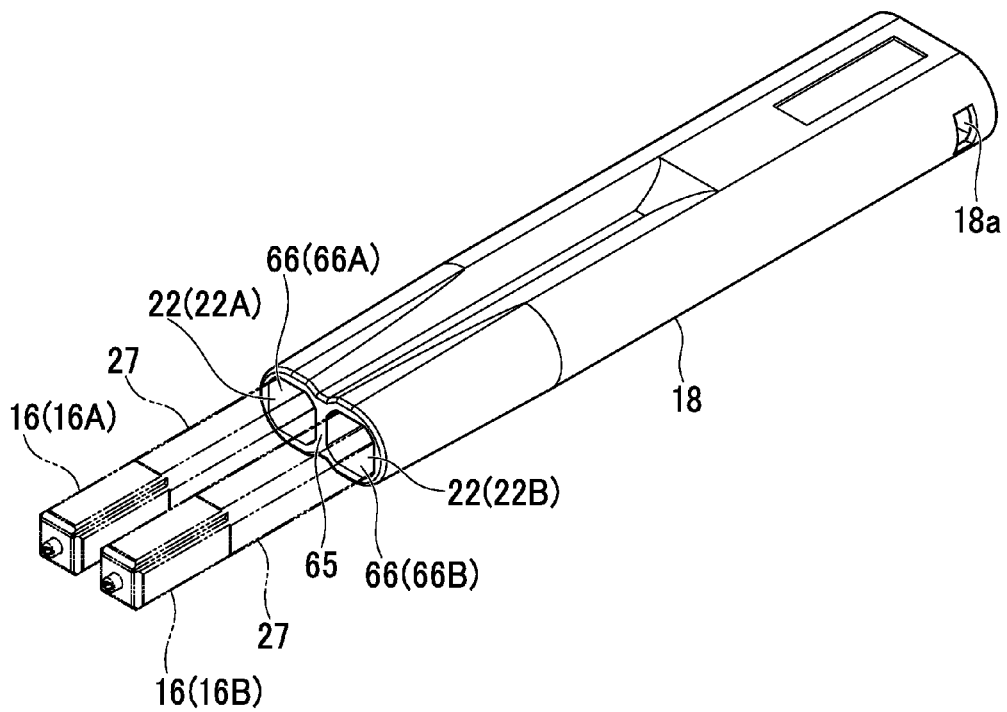
FIG. 9 is a perspective view that shows the outer tube body.
Figure 10:
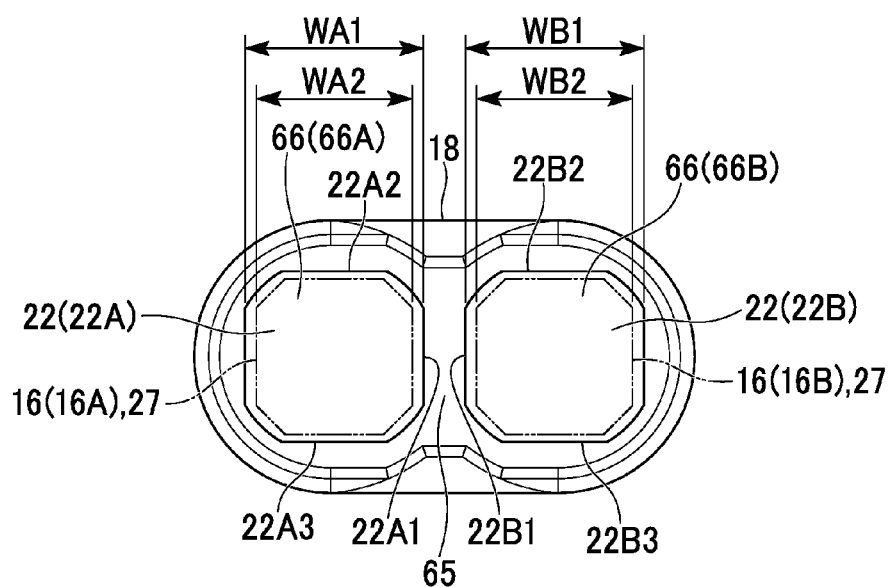
FIG. 10 is a front view that shows the outer tube body.

As shown in FIG. 9 and FIG. 10, the outer tube body 18 is a cylindrical body of which the cross-sectional contour is approximately oblong. A first passing-through hole 66A (passing-through hole 66) that the first distal end tube portion 16A passes through and a second passing-through hole 66B (passing-through hole 66) that the second distal end tube portion 16B passes through are formed in the interior of the outer tube body 18.

The first passing-through hole 66A and the second passing-through hole 66B are separated by a partition wall 65 that is formed over a range of a predetermined length from the distal end of the outer tube body 18 heading rearward.

The partition wall 65 in the illustrations is a wall portion having an approximately fixed thickness, and is formed nearly perpendicular to the width direction of the outer tube body 18 (left and right direction in FIG. 10) along the length direction of the outer tube body 18, from the distal end of the outer tube body 18 until nearly the center position in the length direction.

Note that in the figure, the width direction of the outer tube body 18 is the side-by-side direction of distal end openings 22A and 22B.

As shown in FIG. 10, the shape of the distal end opening 22 (22A and 22B) that is the opening portion at the distal end side of the passing-through holes 66A and 66B is approximately rectangular in conformance with the cross-sectional shape of the distal end tube portions 16A and 16B.

In greater detail, the shape of the distal end opening 22A of the first passing-through hole 66A is approximately rectangular based on the cross-sectional shape of the fine diameter portion 27 of the distal end tube portion 16A that is a portion that passes through the first distal end opening 22A. The shape of the distal end opening 22B of the second passing-through hole 66B is approximately rectangular based on the cross-sectional shape of the fine diameter portion 27 of the distal end tube portion 16B that is a portion that passes through the second distal end opening 22B.

The distal end openings 22A and 22B have the same shape as each other, and one side 22A1 of the distal end opening 22A and one side 22B1 of the distal end opening 22B are formed side-by-side so as to face each other.

Figure 27:
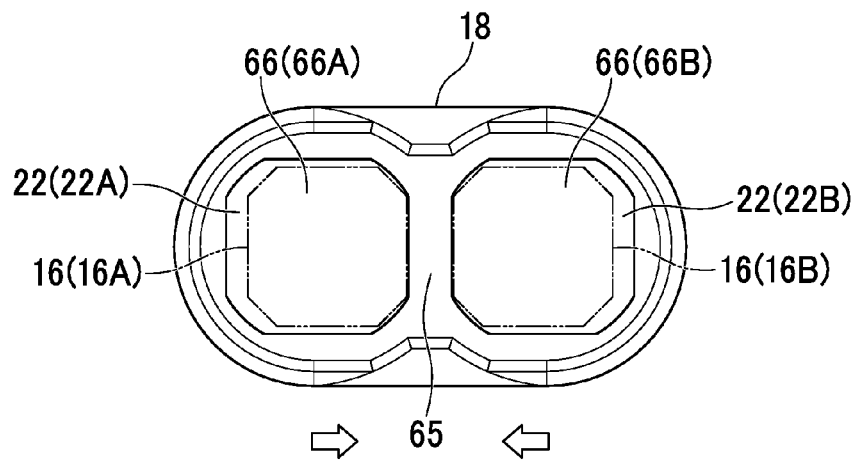
FIG. 27 is a drawing that describes the operation of the distal end tube portions.
Figure 28:
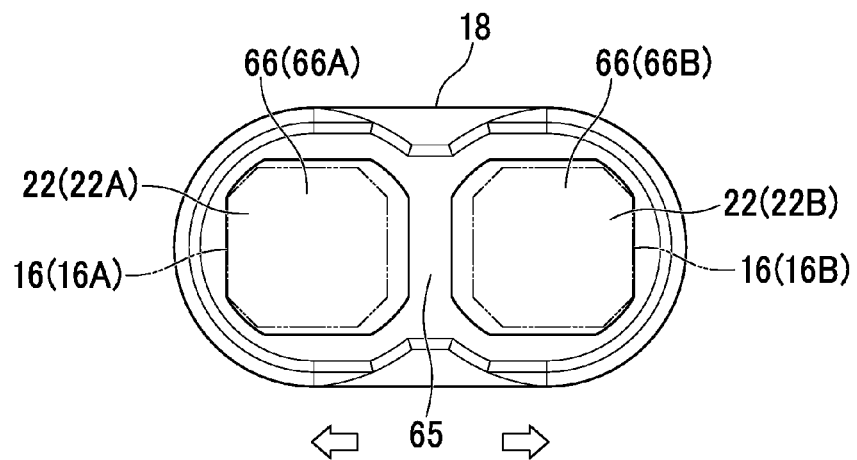
FIG. 28 is a drawing that describes the operation of the distal end tube portions.

As shown in FIG. 10, FIG. 27 and FIG. 28, the distal end openings 22 (22A and 22B) are formed so that the distal end tube portions 16 (16A and 16B) that pass through the distal end openings 22 are capable of moving in directions of mutually approaching and separating.

In greater detail, the width WA1 of the distal end opening 22A (outer width of the distal end tube portion 16 in the side-by-side direction) is greater than the width WA2 of the distal end tube portion 16A (the inner width of the distal end tube portion 16 in the side-by-side direction). Thereby, the distal end tube portion 16A is capable of moving rightward (in the direction approaching the distal end tube portion 16B) and leftward (in the direction moving away from the distal end tube portion 16B) within the distal end opening 22A.

Similarly, the width WB1 of the distal end opening 22B is greater than the width WB2 of the distal end tube portion 16B. Thereby, the distal end tube portion 16B is capable of moving leftward (in the direction approaching the distal end tube portion 16A) and rightward (in the direction moving away from the distal end tube portion 16A) within the distal end opening 22B.

The width of the distal end openings 22, that is to say, the total width of the distal end openings 22A and 22B (total of width WA1 and width WB1) is greater than the total width of the distal end tube portions 16A and 16B (total of width WA2 and width WB2).

The ratio of the width of the distal end openings 22 (total width of the distal end openings 22A and 22B) to the total width of the distal end tube portions 16A and 16B (distal end openings 22: distal end tube portions 16) may be for example 1.05 or more and 1.5 or less.

With this constitution, it is possible to adjust the mutual distance of the distal end tube portions 16 (16A and 16B).

Figure 29:
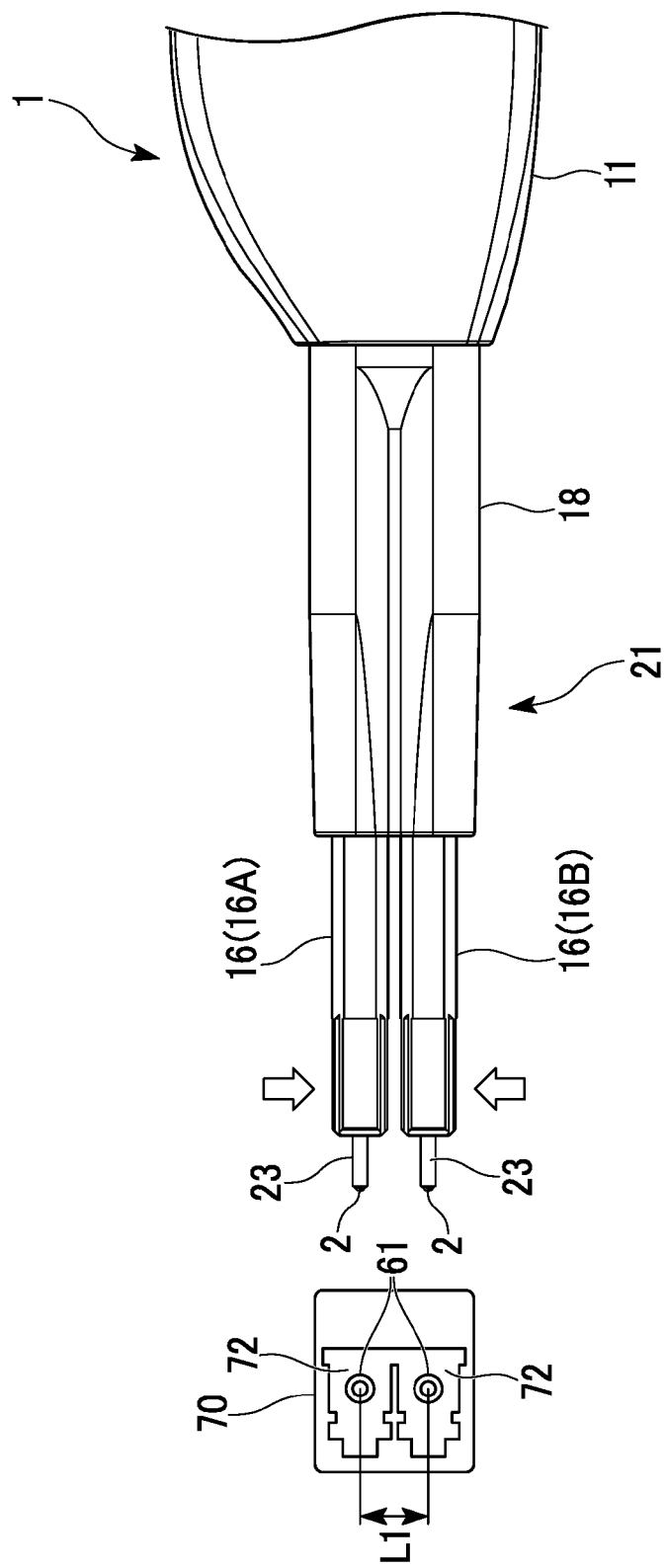
FIG. 29 is a drawing that describes the operation of the distal end tube portions.
Figure 30:
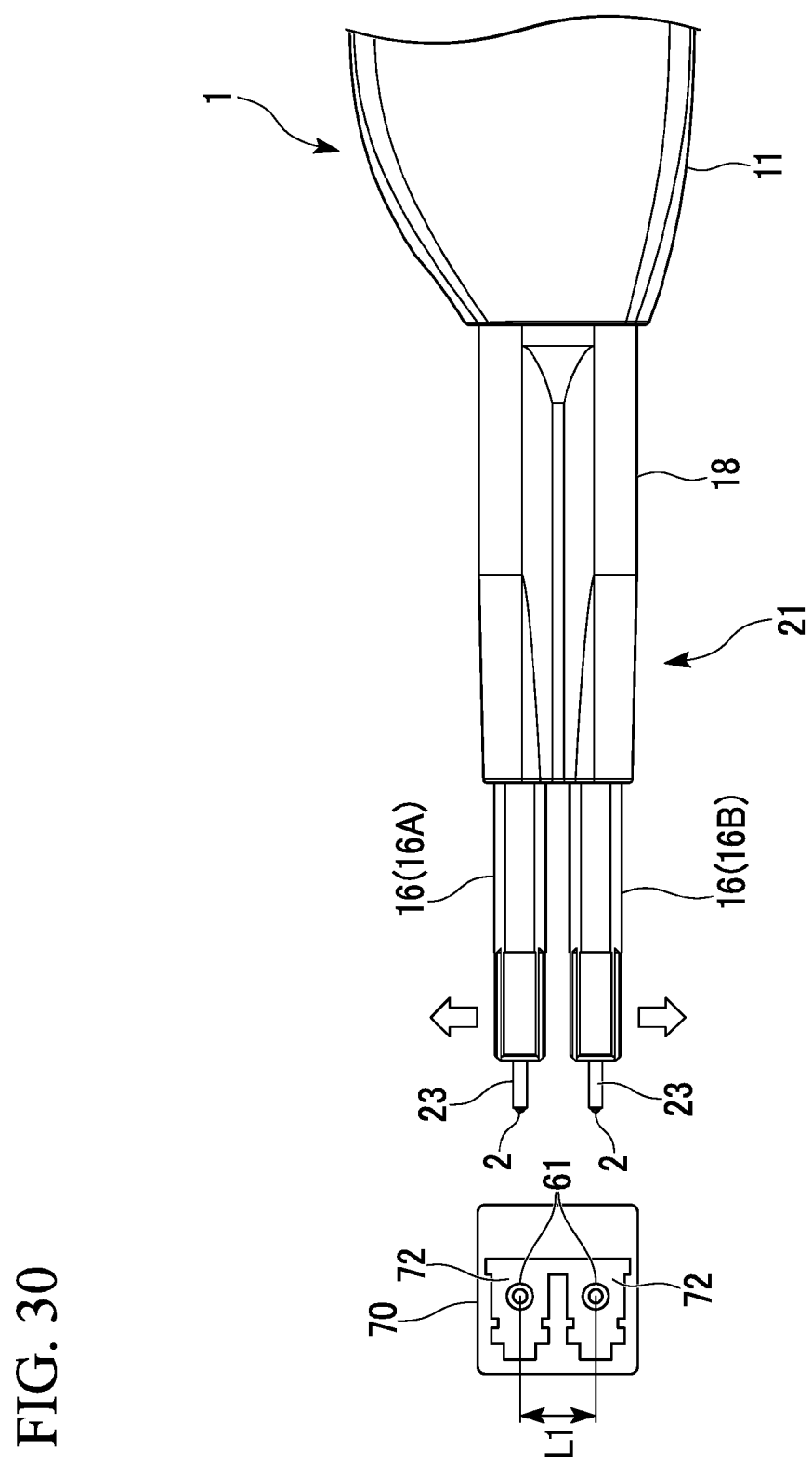
FIG. 30 is a drawing that describes the operation of the distal end tube portions.

FIG. 27 and FIG. 28 shows examples of the pitch of the distal end openings 22 (22A and 22B) being set to an intermediate value of the maximum and minimum connector pitches that are assumed (the distance L1 between the ferrules 61 shown in FIG. 29 and FIG. 30). Depending on the connector pitch, the distal end tube portions 22 sometimes move in directions approaching each other (FIG. 27), and sometimes move in directions apart from each other (FIG. 28).

However, the pitch of the distal end openings 22 (22A and 22B) may be aligned with the maximum connector pitch, and may be aligned with the minimum connector pitch that is assumed. In the case of the former, the distal end tube portions move only in directions approaching each other, while in the case of the latter, the distal end portions move only in directions away from each other.

Since the distal end openings 22A and 22B are formed side-by-side with the side 22A1 and the side 22B1 facing each other, movement of the distal end tube portions 16A and 16B toward and away from each other (the direction heading to the center of the outer tube body 18) is movement in the direction along the upper sides 22A2 and B2 and the lower sides 22A3 and B3 in FIG. 10. For this reason, the distal end tube portions 16A and 16B move smoothly.

Note that in the case of using three or more distal end tube portions 16, the distal end openings 22 should be formed so that the adjacent distal end tube portions 16 and 16 are capable of moving in directions approaching or moving away from each other.

Next, one example of a method of using the cleaning tool 1 of this embodiment shall be described.

Figure 21A:
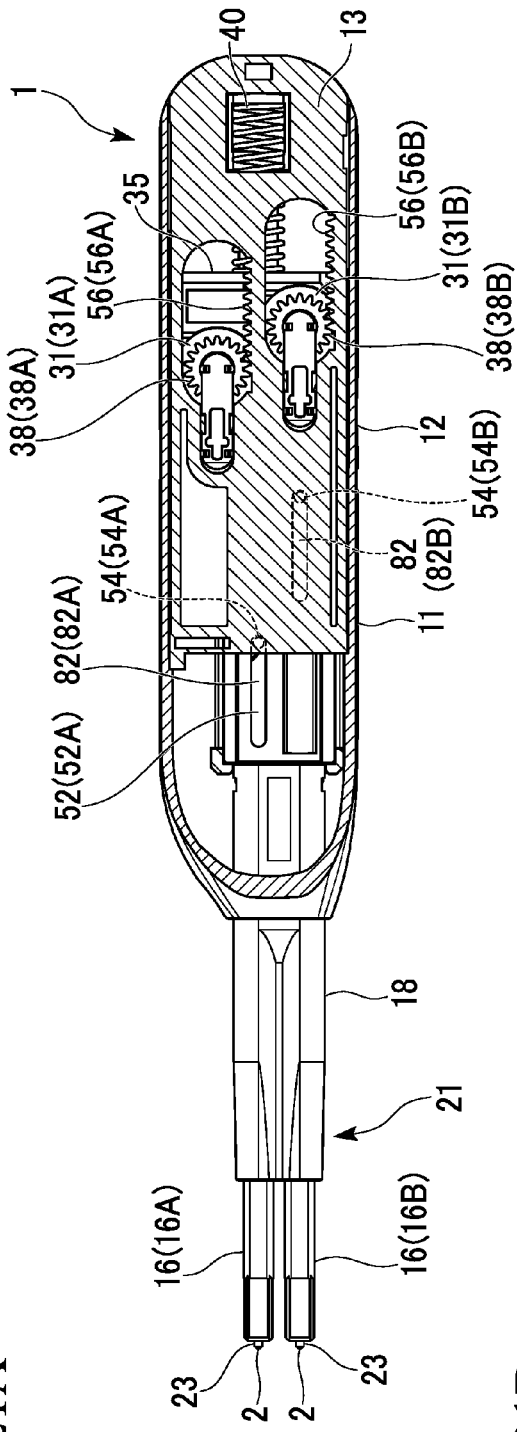
FIG. 21A is a cross-sectional view that shows the normal state of the feeding mechanism, among the process drawings showing the operation of the feeding mechanism.

In a normal state shown in FIG. 21A, the housing body 11 is located relatively at the rear with respect to the extension portion 21 and the feeding mechanism 3.

Also, since the biasing portion 17 (refer to FIG. 7) biases forward the distal end tube portion 16 by taking a reaction force of the connection tube portion 96, the distal end tube portion 16 is located relatively at the front, and the protrusion dimension of the head member 23 that protrudes from the distal end tube portion 16 is small, as shown in FIG. 22.

Figure 18:
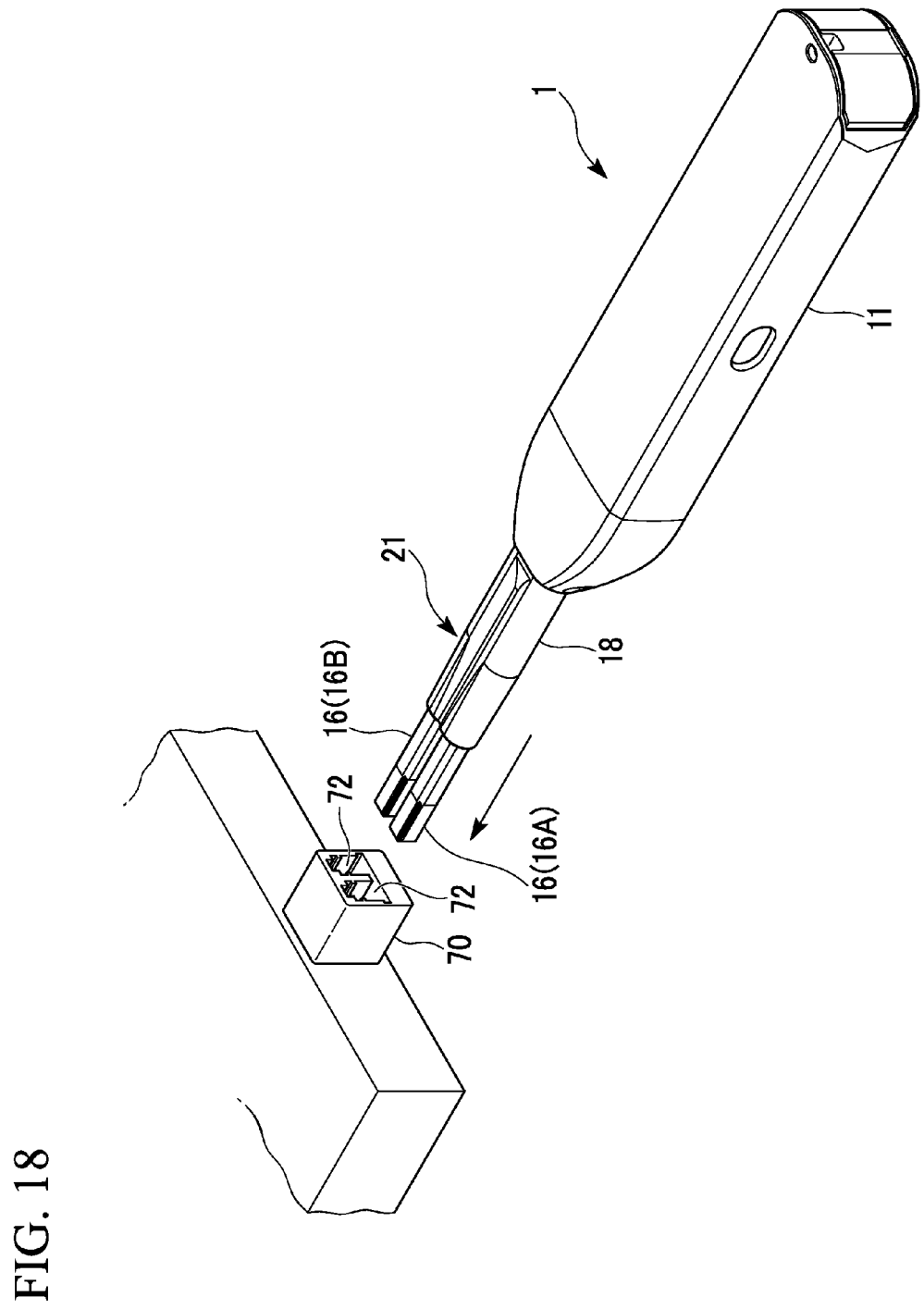
FIG. 18 is a process drawing that shows the method of using the optical connector cleaning tool.

As shown in FIG. 18, this example shows an optical connector adapter 70 (connector positioning housing. Hereinbelow simply referred to as an optical adapter) that has two connector receiving holes 72.

As shown in FIG. 26, an optical connector plug 60 (optical connector. Hereinbelow simply referred to as an optical plug) is inserted in the optical adapter 70.

The optical plug 60 is an optical connector plug that has a constitution that accommodates a ferrule 61 at the distal end of a sleeve-shaped housing 62.

At the center portion of the joining end face 61 of the ferrule 61, an optical fiber hole 61b (fine hole) is opened. An optical fiber 63 is passed through the optical fiber hole 61b, and the distal end of the optical fiber 63 is exposed to the joining end face 61a.

The optical fiber 63 is for example an optical fiber bare wire with the covering resin at the distal end portion of the optical fiber core wire removed. The optical fiber 63 is terminated to be butt-jointable with another optical connector. Here, a ferrule 61 with a circular shape is illustrated. As the ferrule, it is possible to use a widely known single-core optical ferrule, such as an LC-type ferrule.

When the optical plug 60 is inserted from the connector insertion opening 71 of the optical adapter 70, it is received in the connector receiving hole 72 in the state of displacement in a direction shifted from the insertion direction being restricted.

When two optical plugs 60 are inserted from both ends of the optical adapter 70, the ferrules 61 are butt-jointed, and the optical fibers 63 are optically connected.

A reference numeral 73 denotes a split sleeve for positioning that is generally used in an optical adapter.

Figure 19:
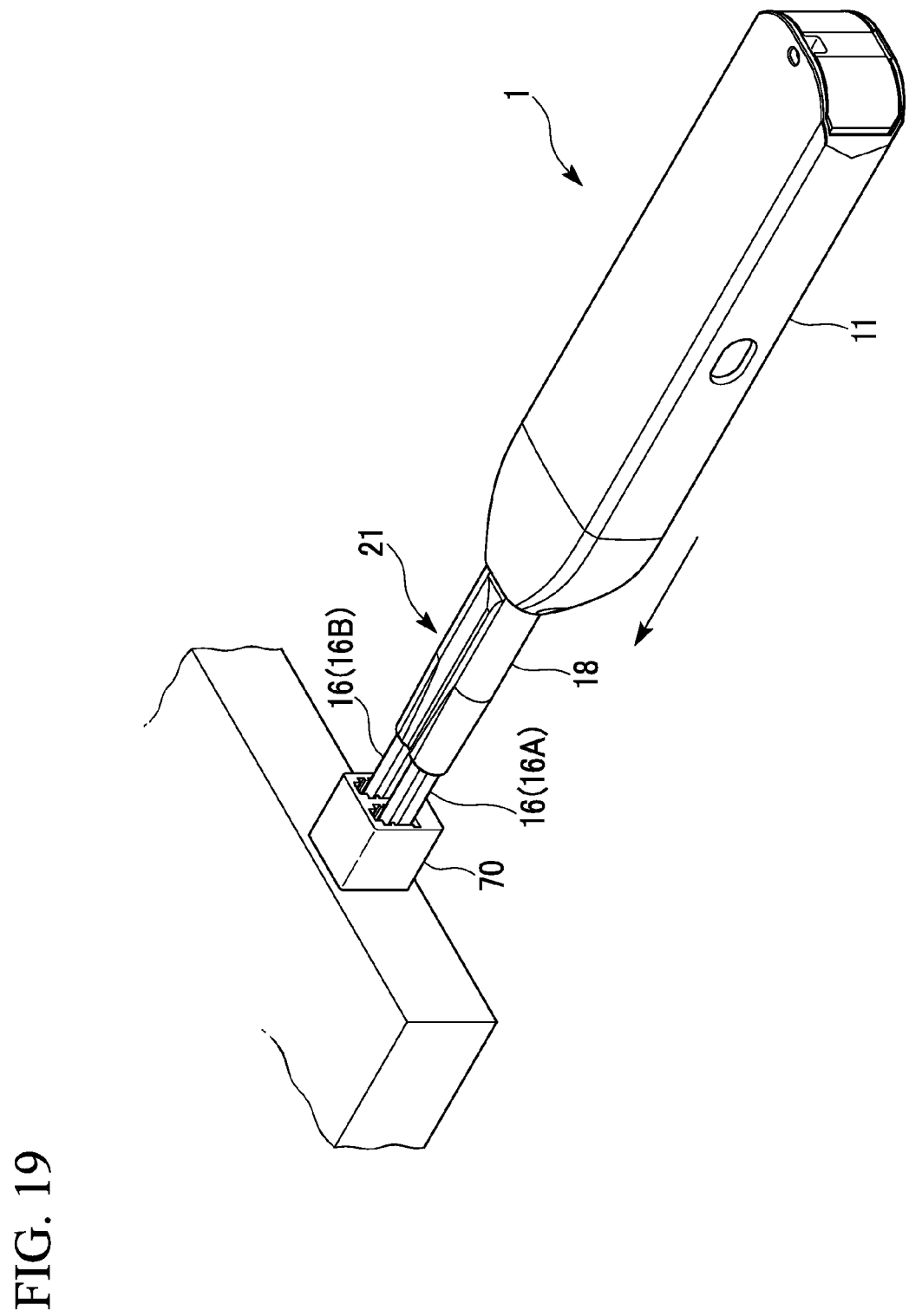
FIG. 19 is a process drawing that continues from the previous drawing.

As shown in FIG. 18, FIG. 19 and FIG. 26, if the housing body 11 of the cleaning tool 1 is gripped, and the two distal end tube portions 16 (16A and 16B) are inserted into the respective connector receiving holes 72 and 72 from the connection insertion holes 71 and 71 of the optical adapter 70, the distal end tube portions 16 (16A and 16B) enter the connector receiving holes 72 while being positioned by the inner wall 70a of the optical adapter 70.

Figure 20:
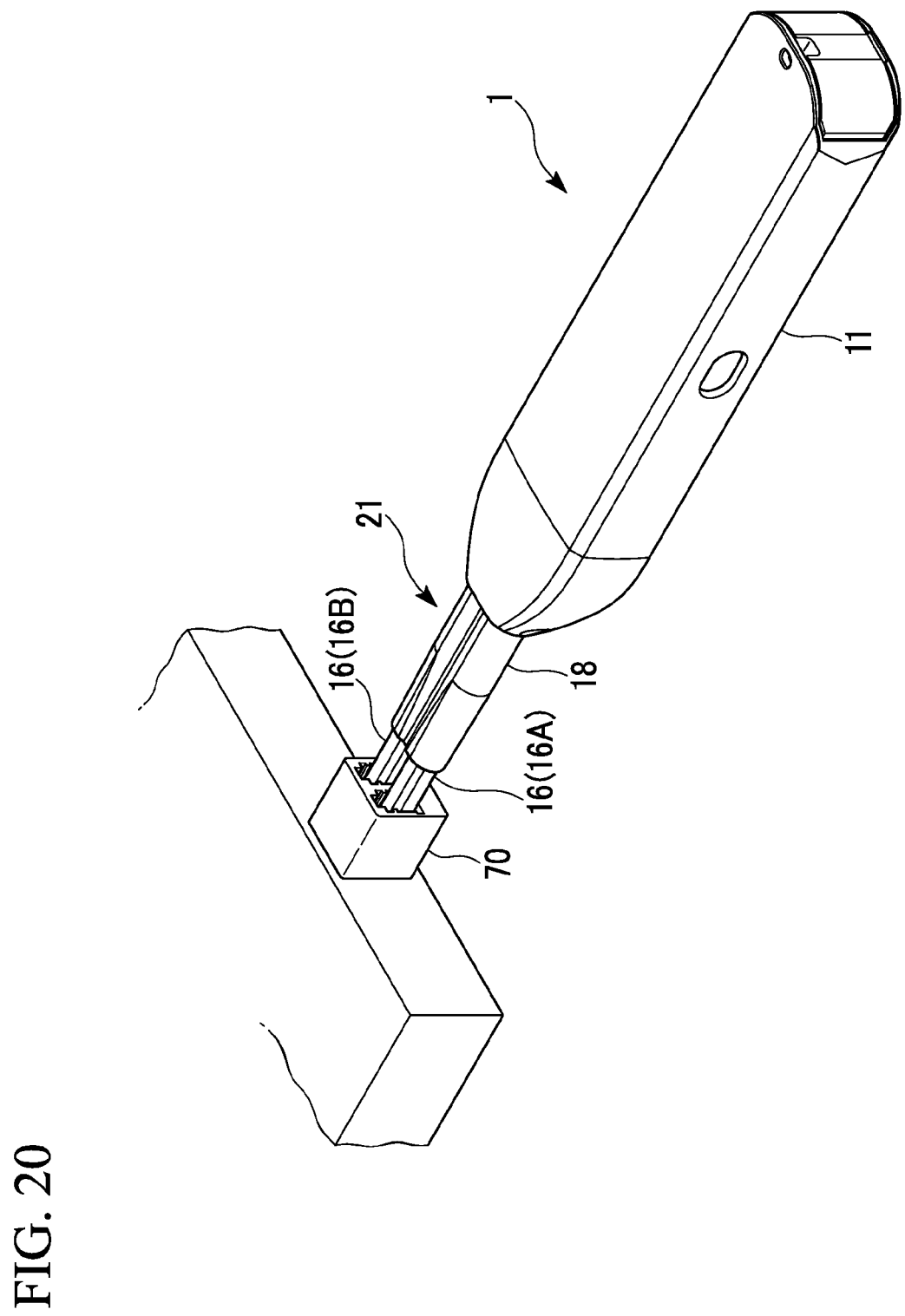
FIG. 20 is a process drawing that continues from the previous drawing.

As shown in FIG. 20 and FIG. 26, if the housing body 11 is moved forward, since the distal end of the distal end tube portion 16 receives a reaction force from a wall portion 70b or the like of the optical adapter 70, the rotating shaft 52 and the head member 23 move forward relatively with respect to the distal end tube portion 16.

Figure 21B:
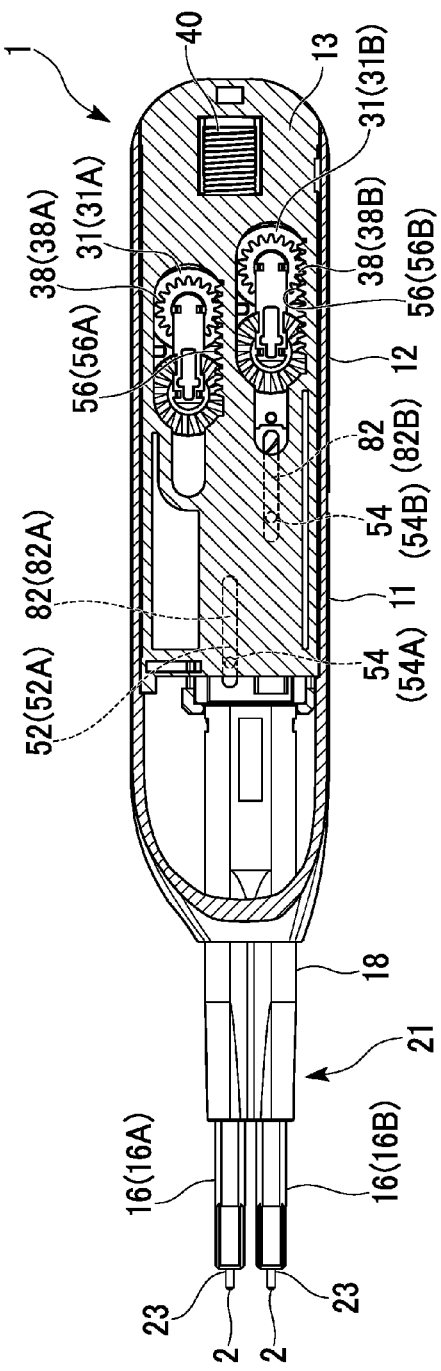
FIG. 21B is a cross-sectional view that shows the state of the housing body moved forward, among the process drawings showing the operation of the feeding mechanism.
Figure 23:
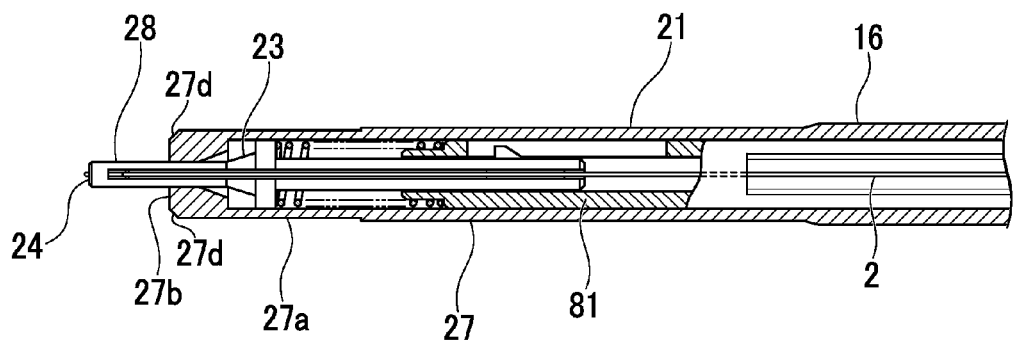
FIG. 23 is a process drawing that continues from the previous drawing.

Accordingly, as shown in FIGS. 21B and 23, the distal end extension portion 28 of the head member 23 protrudes greatly from the distal end of the distal end tube portion 16.

As shown in FIG. 26, the cleaning body 2 on the pressing face 24 abuts an appropriate position (here, an optical fiber hole 61b and the periphery thereof) of the joining end face 61a of the optical plug 60.

As shown in FIG. 21B, if a further forward force is applied to the housing body 11, the housing body 11 moves forward relatively with respect to the extension portion 21 that receives the reaction force in the optical adapter 70.

As shown in FIG. 16 and FIG. 17, at this time, since the tube body base portion 15 of the extension portion 21 is housed in the supporting body 35 in a state where backward movement has been regulated by the partition plate 41g, the position in the front-and-back direction of the feeding mechanism 3 does not change greatly. For this reason, a state is created where the biasing portion 40 is compressed by the pressing body 13, thereby biasing the pressing body 13 backward by taking a reaction force of the supporting body 35.

Figure 25:
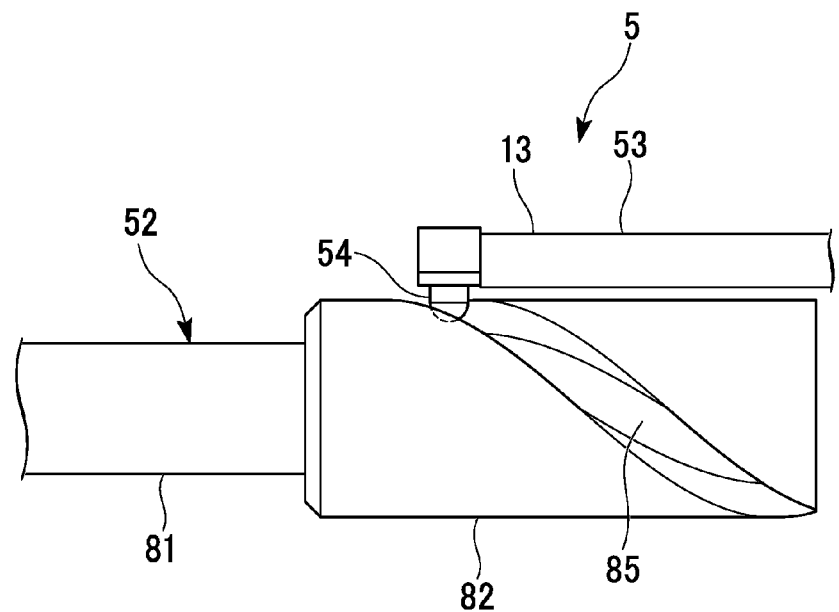
FIG. 25 is a process drawing that continues from the previous drawing.

As shown in FIG. 21B, FIG. 24 and FIG. 25, since the pressing body 13 of the housing body 11 moves forward relative with respect to the rotating tube portion 82, the insertion protrusion portion 54 also moves forward in a state where it has been inserted into the cam groove 85 of the rotating tube portion 82. For this reason, the rotating shaft 52 rotates about the axis thereof.

As shown in FIG. 26, since the head member 23 rotates about the axis thereof by the rotation of the rotating shaft 52, the cleaning body 2 rotates about the axis of the head member 23 while in contact with the joining end face 61a, so that the joining end face 61a is wiped away and cleaned.

As shown in FIG. 16 and FIG. 21B, since the pressing body 13 moves relatively with respect to the feeding mechanism 3, a force in a rotation direction is imparted to the toothed wheel portion 88 of the gear 38 by the gear receiving portion 56. The take-up reel 31 also rotates with the rotation of the gear 38. For this reason, the cleaning body 2 is wound.

According to this, the cleaning body 2 is drawn from the supply reel 30 and fed and moved through the pressing face 24 of the head member 23.

By the feeding movement of the cleaning body 2, contamination such as dirt, dust, or oil, which is attached to the joining end face 61a, is reliably wiped away.

When withdrawing the extension portion 21 from the optical adapter 70, a worker moves the housing body 11 backward.

The positions in the front-and-back direction of the extension portion 21 and the feeding mechanism 3 with respect to the housing body 11 are returned to a normal state (the state shown in FIG. 21A) by the elastic force of the biasing portion 40.

Also, the rotating shaft 52 and the head member 23 move backward relatively with respect to the distal end tube section 16 due to the elastic force of the biasing portion 17 (refer to FIGS. 21A and 22), whereby the protrusion dimension of the head member 23 that protrudes from the distal end tube portion 16 becomes smaller.

Note that in the present embodiment, relative movement in the extension direction includes backward movement aside from forward movement.

In the cleaning tool 1, the distal end tube portions 16A and 16B are capable of moving in directions approaching and separating from each other as mentioned above.

For this reason, as shown in FIG. 29, in the case of the distance L1 (connector pitch) between the ferrules 61 in the two connector receiving holes 72 of the optical adapter 70 being comparatively small, when inserting the two distal end tube portions 16A and 16B in the connector receiving holes 72 and 72, the distal end tube portions 16A and 16B are pressed by the wall portions and the like of the optical adapter 70. Accordingly, the distal end tube portions 16A and 16B move in directions approaching each other in accordance with the positions of the connector receiving holes 72 and 72, and so they can be respectively inserted in the connector receiving holes 72 and 72.

As shown in FIG. 30, in the case of the distance L1 (connector pitch) between the ferrules 61 in the two connector receiving holes 72 of the optical adapter 70 being comparatively large, when inserting the two distal end tube portions 16A and 16B in the connector receiving holes 72 and 72, the distal end tube portions 16A and 16B are pressed by the wall portions and the like of the optical adapter 70. Accordingly, the distal end tube portions 16A and 16B move in directions away from each other in accordance with the positions of the connector receiving holes 72 and 72, and so they can be respectively inserted in the connector receiving holes 72 and 72.

As shown in FIG. 26, since the sloped surface 27d is formed on the distal end tube portion 16, when inserting the distal end tube portion 16 in the connector receiving hole 72, the sloped surface 27d abuts such as the opening end portion 70c of the wall portion of the optical adapter 70. Accordingly, the distal end tube portion 16 is guided to a position suited to insertion into the connector receiving hole 72 along the slope of the sloped surface 27d.

For this reason, a worker can easily insert the distal end tube portion 16 into the connector receiving hole 72 even without adjusting the position of the distal end tube portion 16.

In this way, in the cleaning tool 1, the distal end tube portions 16A and 16B are smoothly inserted into the connector receiving holes 72 and 72 regardless of the positions of the plurality of connector receiving holes 72 of the optical adapter 70.

For this reason, it is possible to reliably clean the joining end faces 61a of a plurality of ferrules 61 with a single operation. Accordingly, it is possible to raise the work efficiency when cleaning the optical adapter 70.

Note that the number of distal end tube portions 16 is not limited to two, and may also be an arbitrary number of three or more. In the case of making the number of distal end tube portions 16 be three or more, the number of rotation mechanisms 5 and the number of head members 23 are made the same number as the distal end tube portions 16.

Also, the present invention is not limited to an optical connector that has a plurality of connector receiving holes, and can also be applied to a structure in which a plurality of optical connectors, each having one connector receiving hole, are arranged.

For the cleaning tool 1 that is shown in FIG. 1, a structure was adopted that feeds the cleaning body 2 by rotatively driving the take-up reel 31 by movement of the housing body 11, but a structure that feeds and moves the cleaning body 2 is not limited thereto. For example, it is also possible to adopt a structure in which a worker can rotatively drive the take-up reel 31 by rotating with a finger a ring-shaped dial portion (not illustrated) that is coaxially fixed to the take-up reel. A structure is also possible that rotatively drives the take-up reel by a motor that is provided within the housing body.

The cleaning tool 1 that is shown in FIG. 1 is provided with a rotation mechanism 5 that rotates the head member 23 about the shaft thereof, but the cleaning tool of the present invention may also not be provided with a structure that rotates the head member 23.

For example, in the cleaning tool 1, if a structure is adopted in which the cam groove 85 is not formed in the rotating tube portion 82 and the insertion protrusion portion 54 is not formed in the pressing body 13, the head member 23 will not rotate about the axis thereof. Even in this case, if the feeding movement of the cleaning body 2 is performed, cleaning of the joining end face 61a of the ferrule 61 within the optical adapter 70 is possible.

In the cleaning tool 1 that is shown in FIG. 1 and the like, the outer tube body 18 has a structure that is capable of passing two distal end tube portions 16, but an outer tube body that passes a distal end tube portion may be provided for each distal end tube portion. For example, in the cleaning tool 1, in place of the outer tube body 18, a first outer tube body that passes the distal end tube portion 16A, and a second outer tube body that passes the distal end tube portion 16B may also be provided.

Also, in the cleaning tool 1 that is shown in FIG. 1 and the like, the two passing-through holes 66 and 66 are formed in the outer tube body 18, and the two distal end openings 22 are formed as the openings of the passing-through holes 66 and 66, but the passing-through hole 66 within the outer tube body 18 may also be one. For example, an outer tube body may be used in which there is no partition wall 65 in the cleaning tool 1 that is shown in FIG. 1 and the like, so that the entire interior space is a single passage hole. In this case, there is one distal end opening 22, and two distal end tube portions 16 pass into this distal end opening 22.

Figure 31:
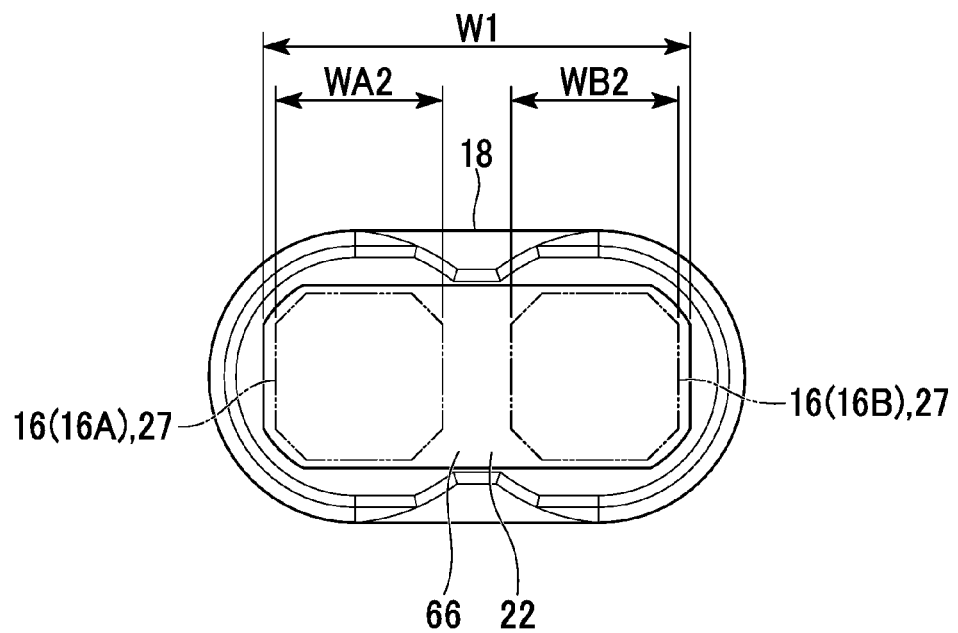
FIG. 31 is a front elevational view that shows another example of the outer tube body.

FIG. 31 shows an example of one distal end opening 22. By making the width W1 of the distal end opening 22 larger than the total of the widths WA2 and WB2 of the distal end tube portion 16, the two distal end tube portions 16 are capable of moving in directions of approaching and separating from each other. The ratio of the width of the distal end opening 22 to the total width of the distal end tube portions 16A and 16B is as mentioned above.

Provided that the distal end tube portions are capable of moving in directions of approaching and separating from each other, the shape of the distal end opening of the outer tube body is not limited to an approximately rectangular shape, and may for example be any shape such as circular or oblong.

The present invention can be applied to various types of optical fiber connectors and can be applied to, for example, single fiber optical connectors such as a LC type optical connector (trademark of Alcatel-Lucent Japan Ltd.), a SC type optical connector (SC: Single fiber Coupling optical fiber connector) which is established in JIS C 5973, a MU type optical connector (MU: Miniature-Unit coupling optical fiber connector) which is established in JIS C 5983, and a SC2 type optical connector. The SC2 type optical connector is one in which a knob that is mounted outside a housing is omitted from the SC type optical connector.

Although in the illustrated example, the optical adapter 70 and the optical plug 60 were shown, the present invention is not limited thereto. For example, a configuration can also be adopted in which an optical connector receptacle (specifically, a receptacle housing) is made to function as a positioning housing for a connector.

In this case, a ferrule incorporated into a sleeve-shaped receptacle housing functions as the optical connector related to the present invention. A joining end face of the ferrule can be cleaned by inserting an insertion portion of the cleaning tool into a connector receiving hole that is an inside space of the receptacle housing.

Also, in the present invention, by using an approximately cylindrical attachment (not illustrated) in which the distal end of the distal end tube portion 16 can be inserted in one end, and the optical plug 60 can be inserted in the other end, it is possible to clean the joining end face 61a of the ferrule 61 of the optical plug 60 without using the optical adapter 70.

It is preferable that the attachment have a positioning cylinder portion in which the ferrule 61 can be inserted from one end, and the distal end extension portion 28 of the head member 23 can be inserted from the other end. With the positioning cylinder portion, it is possible to accurately position the distal end extension position 28 with respect to the ferrule 61 and reliably clean the joining end face 61a.

In the present invention, an optical connector cleaning tool that wipes away and cleans a joining end face of an optical connector by a cleaning body that is fed and moved is provided with a feeding mechanism that performs supply and take-up of the cleaning body; a housing body that houses the feeding mechanism; an extension portion that extends from the housing body; a head member that presses the cleaning body against the joining end face at a distal end of the extension portion; and a rotation mechanism that rotates the head member about the axis thereof, and it is possible to adopt a configuration in which the rotation mechanism is provided with a rotating shaft that rotates the head member about the axis thereof by relative movement of the housing body with respect to the extension portion; the rotating shaft has a rotating tube portion that has a cam groove into which an insertion protrusion portion of the housing body is inserted, and a guide tube portion in which the head member is mounted at the distal end; the rotating tube portion, when the housing body is made to undergo relative movement, rotates about its own axis by movement along the cam groove, whereby it causes the head member to rotate about its axis; and the rotating tube portions of a plurality of rotation mechanisms are arranged with their respective positions shifted in the extension direction of the extension portion.

In the case of adopting this configuration, it is not limited to a structure in which the extension portion that has a plurality of distal end tube portions and an outer tube body through which the plurality of distal end tube portions pass, the distal end tube portions extend from distal end openings of the outer tube body, and the distal end openings allow movement of the plurality of distal end tube portions in directions of approaching and separating from each other.

The present invention can be applied to an optical connector cleaning tool that cleans the joining end face of an optical connector by a cleaning body such as a fabric.

What is claimed is:

1. An optical connector cleaning tool that wipes away and cleans a joining end face of an optical connector by a cleaning body that is fed and moved, the optical connector cleaning tool comprising:
    a feeding mechanism that performs supply and take-up of the cleaning body;
    a housing body that houses the feeding mechanism;
    an extension portion that extends from the housing body; and
    a head member that presses the cleaning body against the joining end face at the distal end of the extension portion, wherein:
    the extension portion comprises a plurality of distal end tube portions, the head member being passed through each distal end tube portion, and an outer tube body through which the distal end tube portions are passed;
    the plurality of distal end tube portions are extended from distal end openings of the outer tube body;
    the distal end openings are formed so that the plurality of distal end tube portions that pass through the distal end openings are movable in directions of approaching and separating from each other
    the outer tube body has a plurality of passing-through holes that are respectively capable of passing the plurality of distal end tube portions; and
    the distal end openings are formed at the distal end of the plurality of passing-through holes.

2. The optical connector cleaning tool according to claim 1, wherein a total inner widths of the distal end openings in a side-by-side direction of the distal end tube portions is greater than a total outer width of the plurality of the distal end tube portions in the side-by-side direction.

3. The optical connector cleaning tool according to claim 1, wherein an inner width of the plurality of the distal end openings in a side-by-side direction of the distal end tube portions is greater than an outer width of the distal end tube portions, each of which passes each of the distal end openings, in the side-by-side direction.

4. The optical connector cleaning tool according to claim 1, wherein a portion of the distal end tube portion that passes through the distal end opening has an approximately rectangular shape in cross section, and
    the plurality of distal end openings have an approximately rectangular shape corresponding to a cross-sectional shape of each of the distal end tube portions, and are formed side-by-side so that one side of each approximately rectangular shape faces one another.

5. The optical connector cleaning tool according to claim 1, wherein the distal end tube portion has a distal end wall portion and a tubular wall portion that extends from the circumferential edge portion of the distal end wall portion; and
    a sloped surface that is sloped toward a distal end direction in a direction gradually approaching a center axis of the distal end tube portion is formed at the circumferential edge portion of the distal end wall portion.

6. The optical connector cleaning tool according to claim 1, wherein the feeding mechanism comprises a supply reel that supplies the cleaning body to the head member, and a take-up reel that takes up the cleaning body that has passed the head member, and
    the housing body is provided with a driving portion that is capable of relative movement in an extension direction of the extension portion with respect to the feeding mechanism, and feeds and moves the cleaning body by rotatively driving the take-up reel in a take-up direction by the movement.

7. The optical connector cleaning tool according to claim 6, further comprising rotation mechanisms of a number corresponding to the extension portion, wherein:
- the rotation mechanism has a rotating shaft that rotates the head member about the axis thereof by relative movement of the housing body with respect to the extension portion;
- the rotating shaft includes a rotating tube portion that has a cam groove into which an insertion protrusion portion of the housing body is inserted, and a guide tube portion in which the head member is mounted at the distal end,
- the rotating tube portion, when the housing body is made to undergo relative movement, rotates about its own axis by movement along the cam groove, whereby it causes the head member to rotate about the axis thereof; and
- the rotating tube portions of a plurality of rotation mechanisms are arranged with their respective positions shifted in the extension direction of the extension portion.

* * * * *